United States Patent
Pecjak et al.

(10) Patent No.: US 9,380,122 B1
(45) Date of Patent: *Jun. 28, 2016

(54) MULTI-PLATFORM OVERLAP ESTIMATION

(71) Applicant: comScore, Inc., Reston, VA (US)

(72) Inventors: Frank Eugene Pecjak, Fairfax, VA (US); Ramzi Joseph Nasr, Falls Church, VA (US); Christopher Shea Haarstick, Reston, VA (US); Ying Li, Reston, VA (US)

(73) Assignee: comScore, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/524,012

(22) Filed: Oct. 27, 2014

Related U.S. Application Data

(63) Continuation of application No. 14/211,375, filed on Mar. 14, 2014, now Pat. No. 8,874,652.

(60) Provisional application No. 61/799,657, filed on Mar. 15, 2013.

(51) Int. Cl.
  *G06F 15/16* (2006.01)
  *H04L 29/08* (2006.01)
  *H04L 12/26* (2006.01)

(52) U.S. Cl.
  CPC ............ *H04L 67/22* (2013.01); *H04L 43/0876* (2013.01)

(58) Field of Classification Search
  CPC .......... G06Q 10/0637; G06Q 30/0205; G06Q 30/0261; H04L 43/0876; H04L 67/18; H04L 67/22; H04L 67/306; H04L 43/12; H04L 41/0213; H04W 4/02; H04W 4/18
  See application file for complete search history.

(56) References Cited

U.S. PATENT DOCUMENTS

| | | | | |
|---|---|---|---|---|
| 8,108,517 B2 * | 1/2012 | Kalavade | ........... | G06Q 10/0637 705/14.58 |
| 8,112,301 B2 * | 2/2012 | Harvey | .............. | G06Q 10/0639 705/14.41 |
| 2008/0086741 A1 * | 4/2008 | Feldman | ................ | G06Q 30/02 725/13 |
| 2010/0312876 A1 * | 12/2010 | Sim | ........................ | G06F 21/316 709/224 |
| 2011/0246641 A1 * | 10/2011 | Pugh | .................... | G06F 17/3089 709/224 |
| 2011/0289431 A1 * | 11/2011 | Olumoko | ........... | G06Q 30/0203 715/753 |
| 2013/0218640 A1 * | 8/2013 | Kidder | ............... | G06Q 30/0204 705/7.33 |

OTHER PUBLICATIONS

Notice of Allowance issued in U.S. Appl. No. 14/211,375 on Jun. 23, 2014, 9 pages.

* cited by examiner

*Primary Examiner* — Abdullahi E Salad
(74) *Attorney, Agent, or Firm* — Fish & Richardson P.C.

(57) ABSTRACT

Panel and census data representing accesses by sets of users with multiple types of media platforms to media content associated with multiple media entities is accessed. An overlap in the accessed panel data that represents users who have accessed media content associated with the media entity with more than one of the multiple types of media platforms is determined. Based on the accessed panel data, the determined overlap in the accessed panel data, and the accessed census data, an overlap function that estimates an overlap in the accessed census data is derived. The derived overlap function is applied to census data associated with a media entity to estimate an overlap in the census data associated with the media entity. The overlap in the census data represents users who have accessed media content associated with the media entity with more than one of the multiple types of media platforms.

19 Claims, 18 Drawing Sheets

MULTI-PLATFORM OVERLAP ESTIMATION

CROSS-REFERENCE TO RELATED APPLICATION

This application is a continuation of U.S. application Ser. No. 14/211,375, filed on Mar. 14, 2014, which claims the benefit of U.S. Provisional Application Ser. No. 61/799,657, filed on Mar. 15, 2013, which is incorporated herein by reference in its entirety.

BACKGROUND

Internet audience measurement may be useful for a number of reasons. For example, some organizations may want to be able to make claims about the size and growth of their audiences or technologies. Similarly, understanding consumer behavior, such as how consumers interact with a particular web site or group of web sites, may help organizations make decisions that improve their traffic flow or the objective of their site. In addition, understanding Internet audience visitation and habits may be useful in supporting advertising planning, buying, and selling.

SUMMARY

In one aspect, a method include accessing panel data representing accesses by a first set of users with multiple types of media platforms to media content associated with multiple media entities, the first set of users being included in a sampled panel of users; based on the accessed panel data, determining, for each of multiple media entities, an overlap in the accessed panel data that represents users in the first set of users who have accessed media content associated with the media entity with more than one of the multiple types of media platforms; accessing census data representing accesses by a second set of users with the multiple types of media platforms to media content associated with the multiple media entities, wherein the second set of users includes a greater number of users than the first set of users; based on the accessed panel data, the determined overlap in the accessed panel data, and the accessed census data, deriving, by one or more processors, an overlap function that estimates an overlap in the accessed census data that represents users in the second set of user who have accessed media content associated with a media entity with more than one of the multiple types of media platforms; and applying, by the one or more processors, the derived overlap function to census data associated with a first media entity to estimate an overlap in the census data associated with the first media entity that represents users who have accessed media content associated with the first media entity with more than one of the multiple types of media platforms.

In another aspect, a method includes accessing panel data representing accesses by a first set of users with multiple types of media platforms to media content associated with multiple media entities, the first set of users being included in a sampled panel of users; based on the accessed panel data, determining, for each of multiple media entities, a panel overlap in the accessed panel data that represents users in the first set of users who have accessed media content associated with the media entity with more than one of the multiple types of media platforms; accessing census data representing accesses by a second set of users with the multiple types of media platforms to media content associated with the multiple media entities, wherein the second set of users includes a greater number of users than the first set of users; based on the accessed panel data, the determined overlap in the accessed panel data, and the accessed census data, estimating, for each of a sub-set of the multiple media entites, a census overlap in the accessed census data, the census overlap representing users in the second set of users who have accessed media content associated with a media entity with more than one of the multiple types of media platforms; based on the census overlap estimated for the subset of media entities and the accessed census data, training a model to generate an overlap function, the overlap function configured to estimate an overlap in the accessed census data that represents users in the second set of user who have accessed media content associated with a media entity in the subset of media entities with more than one of the multiple types of media platforms; and applying, by the one or more processors, the derived overlap function to census data associated with a first media entity to estimate an overlap in the census data associated with the first media entity, the estimated overlap in the census data represents users who have accessed media content associated with the first media entity with more than one of the multiple types of media platforms.

Implementations of any of the described techniques may include a method or process, an apparatus, a device, a machine, a system, or instructions stored on a computer-readable storage device. The details of particular implementations are set forth in the accompanying drawings and description below. Other features will be apparent from the following description, including the drawings, and the claims.

DETAILED DESCRIPTION

In general, webpage or other resource accesses by client systems may be recorded, and those accesses may be analyzed to develop audience measurement reports. Data about resource accesses can be collected using a beacon-based approach. A beacon-based approach generally involves associating script or other code with the resource being accessed such that the code is executed when a client system renders or otherwise employs the resource. When executed, the beacon code sends a message from the client system to a collection server. The message includes certain information, such as an identifier of the resource accessed.

The beacon code may be accessed and processed by a number of different types of client systems, such as personal computers, mobile devices, and shared use devices (for example, computers at libraries or internet cafés). However, each type of device may present somewhat different challenges when translating the measured activity from a machine-basis to a person-basis. For instance, a beacon-based approach may employ cookies or IP addresses to help uniquely identify the activity of a particular machine. However, there may be difficulties in translating such activity to unique persons because cookies may be deleted or IP addresses may be dynamically assigned. Such issues are more or less prevalent depending on the type of device. Accordingly, the following describes various techniques for accounting for these types of difficulties on various types of client systems when determining audience measurements such as unique views or reach.

Furthermore, a given user may use more than one type of device. Yet for certain types of audience measurements, such as unique views or reach, that person should be counted once, rather than multiple times. Because he or she is using a different device, however, it may be difficult to understand that the same person is using both types of devices. Accordingly, the following describes various techniques for accounting for such overlap when combining audience measurements across different device types.

Figure 1:
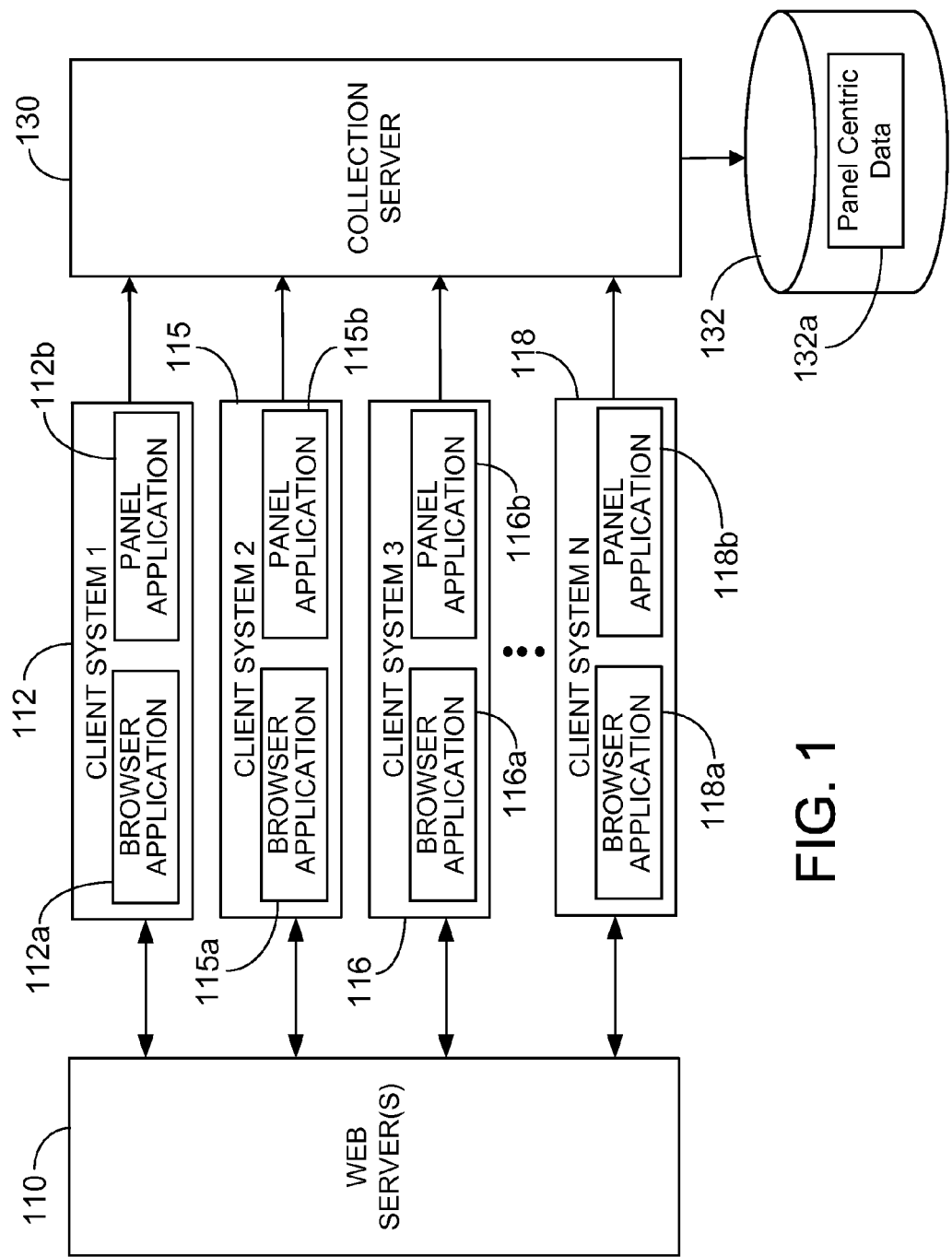
FIG. 1 illustrates an example of a system in which a panel of users may be used to perform Internet audience measurement.

FIG. 1 illustrates an example of a system 100 in which a panel of users may be used to collect data for Internet audience measurement. As described in more detail below, data from the panel of users may be used to correct or adjust beacon-based data for personal computers (e.g., non-mobile, non-shared use devices).

The system 100 includes client systems 112, 114, 116, and 118, one or more web servers 110, a collection server 130, and a database 132. In general, the users in the panel employ client systems 112, 114, 116, and 118 to access resources on the Internet, such as webpages located at the web servers 110. Information about this resource access is sent by each client system 112, 114, 116, and 118 to a collection server 130. This information may be used to understand the usage habits of the users of the Internet.

Each of the client systems 112, 114, 116, and 118, the collection server 130, and the web servers 110 may be implemented using, for example, a general-purpose computer capable of responding to and executing instructions in a defined manner, a personal computer, a special-purpose computer, a workstation, a server, or a mobile device. Client systems 112, 114, 116, and 118, collection server 130, and web servers 110 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by a client system 112, 114, 116, and 118, collection server 130, and web servers 110.

In the example shown in FIG. 1, the system 100 includes client systems 112, 114, 116, and 118. However, in other implementations, there may be more or fewer client systems. Similarly, in the example shown in FIG. 1, there is a single collection server 130. However, in other implementations there may be more than one collection server 130. For example, each of the client systems 112, 114, 116, and 118 may send data to more than one collection server for redundancy. In other implementations, the client systems 112, 114, 116, and 118 may send data to different collection servers. In this implementation, the data, which represents data from the entire panel, may be communicated to and aggregated at a central location for later processing. The central location may be one of the collection servers.

The users of the client systems 112, 114, 116, and 118 are a group of users that are a representative sample of the larger universe being measured, such as the universe of all Internet users or all Internet users in a geographic region. To understand the overall behavior of the universe being measured, the behavior from this sample is projected to the universe being measured. The size of the universe being measured and/or the demographic composition of that universe may be obtained, for example, using independent measurements or studies. For example, enumeration studies may be conducted monthly (or at other intervals) using random digit dialing.

Similarly, the client systems 112, 114, 116, and 118 are a group of client systems that are a representative sample of the larger universe of client systems being used to access resources on the Internet. As a result, the behavior on a machine basis, rather than person basis, can also be, additionally or alternatively, projected to the universe of all client systems accessing resources on the Internet. The total universe of such client systems may also be determined, for example, using independent measurements or studies.

The users in the panel may be recruited by an entity controlling the collection server 130, and the entity may collect various demographic information regarding the users in the panel, such as age, sex, household size, household composition, geographic region, number of client systems, and household income. The techniques used to recruit users may be chosen or developed to help insure that a good random sample of the universe being measured is obtained, biases in the sample are minimized, and the highest manageable cooperation rates are achieved. Once a user is recruited, a monitoring application is installed on the user's client system. The monitoring application collects the information about the user's use of the client system to access resources on the Internet and sends that information to the collection server 130.

For example, the monitoring application may have access to the network stack of the client system on which the monitoring application is installed. The monitoring application may monitor network traffic to analyze and collect information regarding requests for resources sent from the client system and subsequent responses. For instance, the monitoring application may analyze and collect information regarding HTTP requests and subsequent HTTP responses.

Thus, in system 100, a monitoring application 112b, 114b, 116b, and 118b, also referred to as a panel application, may be installed on each of the client systems 112, 114, 116, and 118. Accordingly, when a user of one of the client systems 112, 114, 116, or 118 employs, for example, a browser application 112a, 114a, 116a, or 118a to visit and view web pages, information about these visits may be collected and sent to the collection server 130 by the monitoring application 112b, 114b, 116b, and 118b. For instance, the monitoring application may collect and send to the collection server 130 the URLs of web pages or other resources accessed, the times those pages or resources were accessed, and an identifier associated with the particular client system on which the monitoring application is installed (which may be associated with the demographic information collected regarding the user or users of that client system). For example, a unique identifier may be generated and associated with the particular copy of the monitoring application installed on the client system. The monitoring application also may collect and send information about the requests for resources and subsequent responses. For example, the monitoring application may collect the cookies sent in requests and/or received in the responses. The collection server 130 receives and records this information. The collection server 130 aggregates the recorded information from the client systems and stores this aggregated information in the database 132 as panel centric data 132a.

The panel centric data 132a may be analyzed to determine the visitation or other habits of users in the panel, which may be extrapolated to the larger population of all Internet users. The information collected during a particular usage period (session) can be associated with a particular user of the client system (and/or his or her demographics) that is believed or known to be using the client system during that time period. For example, the monitoring application may require the user to identify his or herself, or techniques such as those described in U.S. Patent Application No. 2004-0019518 or U.S. Pat. No. 7,260,837, both incorporated herein by reference in their entirety, may be used. Identifying the individual using the client system may allow the usage information to be determined and extrapolated on a per person basis, rather than a per machine basis. In other words, doing so allows the measurements taken to be attributable to individuals across machines within households, rather than to the machines themselves.

To extrapolate the usage of the panel members to the larger universe being measured, some or all of the members of the panel are weighted and projected to the larger universe. In some implementations, a subset of all of the members of the panel may be weighted and projected. For instance, analysis of the received data may indicate that the data collected from some members of the panel may be unreliable. Those members may be excluded from reporting and, hence, from being weighted and projected.

The reporting sample of users (those included in the weighting and projection) are weighted to insure that the reporting sample reflects the demographic composition of the universe of users to be measured, and this weighted sample is projected to the universe of all users. This may be accomplished by determining a projection weight for each member of the reporting sample and applying that projection weight to the usage of that member. Similarly, a reporting sample of client systems may be projected to the universe of all client systems by applying client system projection weights to the usage of the client systems. The client system projection weights are generally different from the user projection weights.

The usage behavior of the weighted and projected sample (either user or client system) may then be considered a representative portrayal of the behavior of the defined universe (either user or client system, respectively). Behavioral patterns observed in the weighted, projected sample may be assumed to reflect behavioral patterns in the universe.

Estimates of visitation or other behavior can be generated from this information. For example, this data may be used to estimate the number of unique visitors (or client systems) visiting certain web pages or groups of web pages, or unique visitors within a particular demographic visiting certain web pages or groups of web pages. This data may also be used to determine other estimates, such as the frequency of usage per user (or client system), average number of pages viewed per user (or client system), and average number of minutes spent per user (or client system).

As described further below, such estimates and/or other information determined from the panel centric data may be used with data from a beacon-based approach to generate reports about audience visitation or other activity. Using the panel centric data with data from a beacon-based approach may improve the overall accuracy of such reports.

Figure 2:
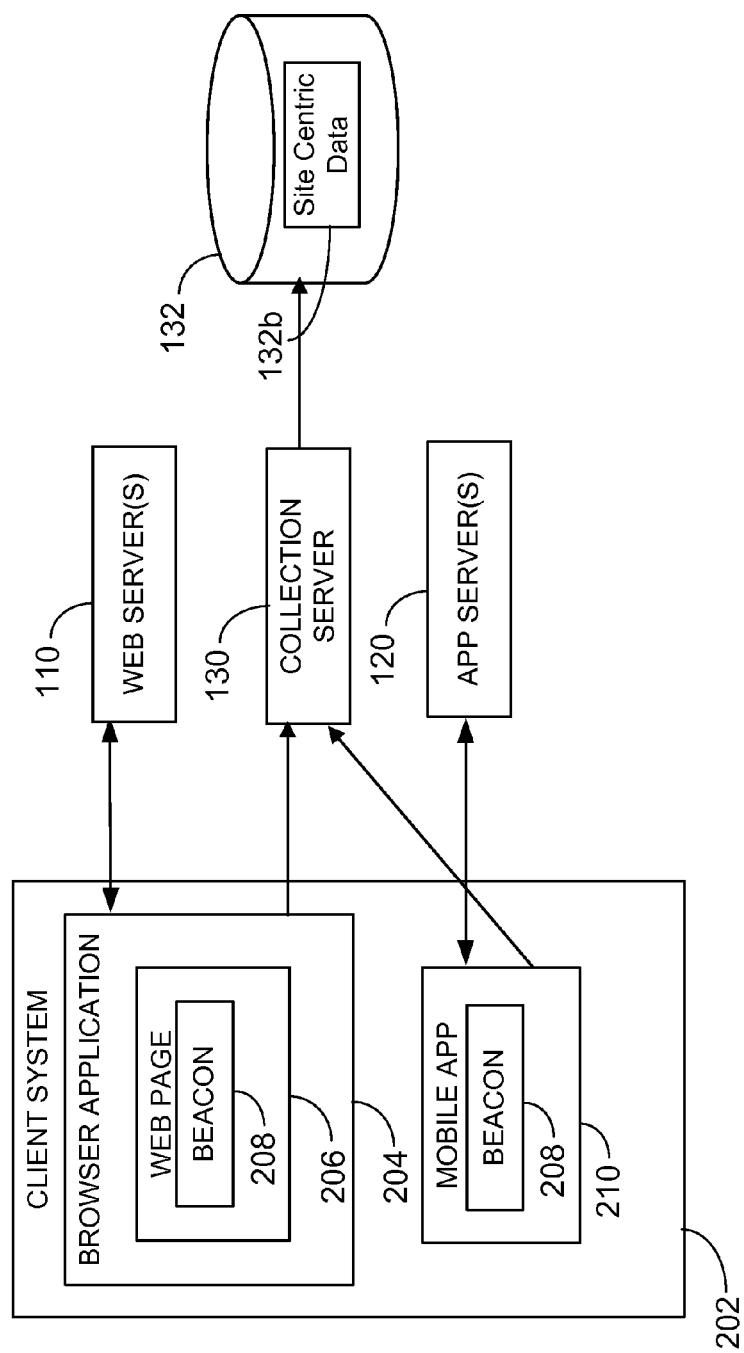
FIG. 2 illustrates an example of a system in which site centric data can be obtained by including beacon code in one or more web pages.

Referring to FIG. 2, a beacon-based approach may be implemented using a system 200. In general, a beacon-based approach may entail including beacon code in one or more web pages.

System 200 includes one or more client systems 202, the web servers 110, the collection servers 130, and the database 132. The client systems 202 can include client systems 112, 114, 116, or 118, which have the panel application installed on them, as well as client systems that do not have the panel application installed. Client systems may include personal computing devices, mobile computing devices, shared use computing devices, or any other device with access to the Internet.

The client systems include a browser application 204 that retrieves web pages 206 from web servers 110 and renders the retrieved web pages. Some of the web pages 206 include beacon code 208. In general, publishers of web pages may agree with the entity operating the collection server 130 to include this beacon code in some or all of their web pages. This code 208 is rendered with the web page in which the code 208 is included. When rendered, the code 208 causes the browser application 204 to send a message to the collection server 130. This message includes certain information, such as the URL of the web page in which the beacon code 208 is included. For example, the beacon code may be JavaScript code that accesses the URL of the web page on which the code is included, and sends to the collection server 130 an HTTP Post message that includes the URL in a query string. Similarly, the beacon code may be JavaScript code that accesses the URL of the web page on which the code is included, and includes that in the URL in the "src" attribute of an <img> tag, which results in a request for the resource located at the URL in the "src" attribute of the <img> tag to the collection server 130. Because the URL of the webpage is included in the "src" attribute, the collection server 130 receives the URL of the webpage. The collection server 130 can then return a transparent image. The following is an example of such JavaScript:

```
<script type="text/javascript">
document.write("<img                    id='img1'
height='1'width='1'>");document.getElementById
("img1").src="http://example.com/scripts/report.dll?C7="+
escape(window.location.href)+"&rn="+Math.floor(Math.
random( )*99999999);
</script>
```

The collection server 130 records the webpage URL received in the message with, for instance, a time stamp of when the message was received, the IP address of the client system from which the message was received, and the user-agent information in the user-agent header. The collection server 130 aggregates this recorded information and stores this aggregated information in the database 132 as site centric data 132b.

The message may also include a unique identifier for the client system. For example, when a client system first sends a beacon message to the collection server 130, a unique identifier may be generated for the client system (and associated with the received beacon message). That unique identifier may then be included in a cookie that is set on that client system 202. As a result, later beacon messages from that client system may have the cookie appended to them such that the messages include the unique identifier for the client system. If a beacon message is received from the client system without the cookie (e.g., because the user deleted cookies on the client system), then the collection server 130 may again generate a unique identifier and include that identifier in a new cookie set of the client system.

The client system 202 may further include a specialized application such as a mobile app 210 for accessing data associated with a network resource. In some implementations, a mobile app 210 may communicate with an app server 120 to send and receive data. The app server 120 may be a function of a general purpose web server 110 as above or may instead be a separate server dedicated only to proprietary applications such as the mobile app 210. In addition to accessing information associated with a resource, the mobile app may also include code 208 that includes beacon instructions for reporting usage data to the collection server 130. The beacon instructions provided to the mobile app 210 may be similar to the beacon instructions provided on the web page 206 to the browser application, but may include different information available to the mobile app 210, such as a unique device identifier.

The beacon messages are generally sent regardless of whether or not the given client system has the panel application installed. But, for client systems in which the panel application is installed, the panel application also records and reports the beacon message to the collection server 130. For example, if the panel application is recording HTTP traffic, and the beacon message is sent using an HTTP Post message (or as a result of an <img> tag), then the beacon message is recorded as part of the HTTP traffic recorded by the panel application, including, for instance, any cookies that are included as part of the beacon message. Thus, in this instance, the collection server 130 receives the beacon message as a result of the beacon code, and a report of the beacon message as part of the panel application recording and reporting network traffic.

Accordingly, as users of client systems 202 access webpages (e.g., on the Internet), the client systems 202 access the webpages that include the beacon code, which results in messages being sent to the collection server 130. These messages indicate the webpage that was accessed (e.g., by including the URL for the webpage), potentially a unique identifier for the client system that sent the message, and a user-agent of the client system. When a message is received at the collection server 130, a record may be generated for the received message. The record may indicate an identifier (e.g., the URL) of the webpage accessed by the client system, the unique identifier for the client system, a time at which the client system accessed the webpage (e.g., by including a time stamp of when the message was received by the collection server 130), a network address, such as an IP address, of the client system that accessed the webpage, and the user-agent, when appropriate. The collection server 130 may then aggregate these records and store the aggregated records in the database 132 as site centric data 132b, which is also known as census data.

The site centric data 132b includes information about the accesses by a number of different types of client systems, such as mobile client systems, shared use client systems, and non-mobile, non-shared use personal computers. The site centric data 132b directly represents accesses by the members of the larger universe to be measured, not just the members of the panel, but because different devices are included in the data, there may be overlap between users of the different types of devices, with no ready mechanism to determine that the same user accessed a resource from, for example, both a mobile device and a personal computer. This may skew measurements of unique visitors to a given resource or group of resources and potentially inflate unique visitor estimates. Furthermore, because of the technology involved with each type of device, there may be inaccuracies when determining the unique visitors within a given type of device. The following describes various techniques for correcting such data within a given class of device, as well as when the data among device classes is combined.

Figure 3:
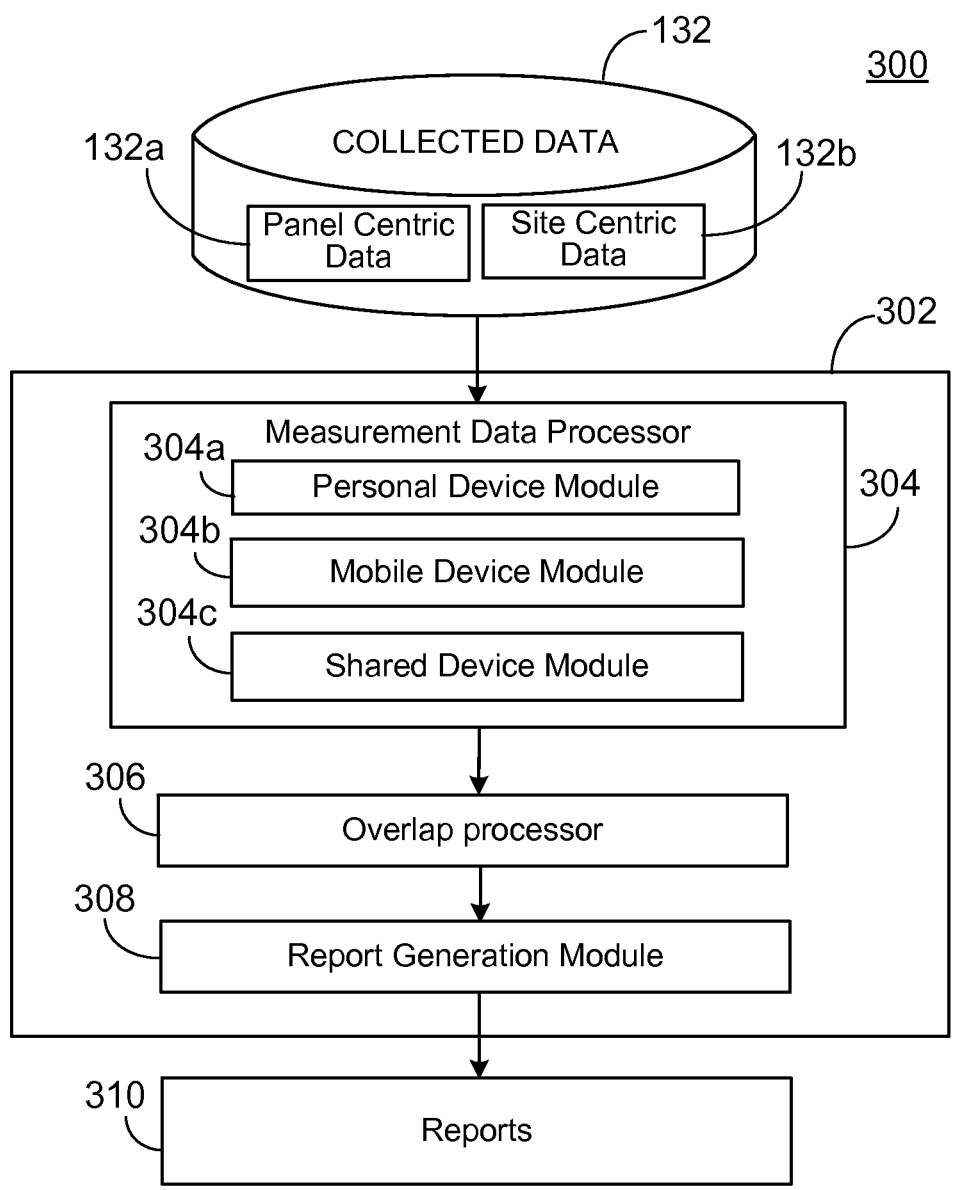
FIG. 3 illustrates an example of a system in which panel centric data and site centric data can be used to generate measurement data.

FIG. 3 illustrates an example of a system 300 in which panel centric data 132a and site centric data 132b can be used to generate measurement data. The system 300 includes a reporting server 302. The reporting server 302 may be implemented using, for example, a general-purpose computer capable of responding to and executing instructions in a defined manner, a personal computer, a special-purpose computer, a workstation, a server, or a mobile device. The reporting server 302 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by the reporting server 302.

The reporting server 302 executes instructions that implement a measurement data processor 304, an overlap processor 306, and a report generation module 308. The measurement data processor 304 includes a personal device module 304a, a mobile device module 304b, and a shared use device module 304c.

The measurement data processor 304 may access the raw panel centric data 132a and the raw site centric data 132b and perform one or more pre-processing functions on the accessed panel centric data 132a and the accessed site centric data 132b. As described above, the panel centric data 132a indicates a first set of resources accessed by a first set of client systems (those in the panel) and the site centric data 132b indicates a second set of resources accessed by a second set of client systems. Some of the second set of client systems are potentially in the panel and some of the second set of client systems are potentially not in the panel. Further, the second set of resources may include one or more resources that are also included in the first set of resources.

The panel centric data 132a may include records that reflect the URLs or other identifiers of web pages or other resources accessed, the times those pages or resources were accessed, identifiers of the client systems that accessed the resources, and information about the requests and responses used to access the resources (for example, cookies sent in requests and/or received in the responses). The site centric data 132b may include records that reflect a URL or other identifier of a resource that has been accessed by a client system, a network address of the client system that accessed the resource, a time that the client system accessed the resource (for example, as reflected by a time stamp of the time at which the beacon message was received by the collection server 130), and a unique identifier for the client system that accessed the resource (for example, included in a cookie attached to the beacon message).

The panel centric data 132a and the site centric data 132b that is accessed by the personal device module 304a may be the data that is aggregated for a certain, previous time period. For example, the accessed data may be the panel centric data 132a and the site centric data 132b aggregated over the previous 30 days.

The measurement data processor 304 may process the raw panel centric data 132a to form state data that represents the complete fact of usage in a single record. For instance, for web page visitation, a record in the state data may indicate that a particular user, on a particular date, at a particular time, accessed web page B (as represented by the URL for that web page), using a particular client system. The measurement data processor 304 also may match some or all of the URLs in the records of the state data to patterns in a dictionary of the Internet, which may organize various different URLs into digital media properties, reflecting how Internet companies operate their businesses. Each pattern may be associated with a media entity, which may be a web page or collection of web pages that are logically grouped together in a manner that reflects how Internet companies operate their business. For example, the various web pages that are included in the finance.yahoo.com domain may be logically grouped together into a single media entity (e.g., Yahoo Finance). The dictionary may include a number of hierarchically media entities to reflect various Internet media companies and how those companies arrange their web properties. For example, the Yahoo Finance media entity may be considered a subset of the Yahoo media entity, which may cover all of the various web pages included in the yahoo.com domain. The Yahoo media entity may include other media entities, such as a Yahoo Health media entity (associated with the various web pages in the health.yahoo.com domain). The measurement data processor 304 may associate a given state record with the lowest-level media entity associated with the pattern matching the URL in the state record.

The measurement data processor 304 may also remove from the panel centric data 132a records for users that are not to be included in the reporting sample. For example, there may be rules that are evaluated to insure that a complete record of a user's usage and non-usage during the reporting period is received. If those rules are not met, the user may be removed from the reporting sample. Also, a user may be removed if he or she does not meet certain criteria, such as being in a particular geographic area.

In addition, the personal device module 304a may remove certain types of records. For instance, records that reflect redirects or that reflect non-human initiated request (e.g., requests made as part of rendering a web page) may be removed.

The measurement data processor 304 may process the site centric data 132b to also match some or all of the URLs in the records of the site centric data 132b to patterns in the dictionary so as to associate the records with a media entity, such as the lowest level media entity in a hierarchy. Processing actions may then be performed on a per-media-entity basis to determine the measurement data 306. For example, processing may be performed for each of the lowest-level media entities, or may be performed for one or more higher level media entities, with the dictionary being used to collect the data associated with all of the lowest-level media entities included in the higher level media entity.

In addition, the measurement data processor 304 may remove certain records from the site centric data 132b. For example, the personal device module 304a may remove records that reflect non-human initiated accesses from the site centric data 132b. For example, a list of known search index crawlers or other robots may be used to remove records that reflect accesses from those bots. Additionally, or alternatively, if the records indicate that sequential accesses to the same or different web pages in a media entity by a particular client system occur at a defined frequency (for example, if the accesses are spaced three seconds apart or less), then accesses subsequent to the first one may be removed. This may help to remove records from non-human initiated accesses, as well as errors associated with the beacon code that may result in more than one beacon message per access.

The measurement data processor 304 may categorize the records according to device type. For instance, records for mobile devices may be detected and categorized accordingly. In some implementations, such records may be detected based on user agent or other data sent with the beacon message and recorded in the record. The measurement data processor 304 may also detect records for non-mobile, shared use client systems and categorize them accordingly. Techniques such as those described with respect to FIG. 12 may be used to detect non-mobile, shared use systems. The remaining non-categorized records may be marked as non-mobile, non-shared use systems (or other techniques may be used to detect records from such systems—for example, such systems may be detected based on the user agent data).

In addition, records may be removed for client systems not in a particular geographic area (e.g., if the reports are being generated for a particular geographic area, such as North America). The country and region of the client system corresponding to the record may be determined based on a reverse lookup of the network address (e.g., a reverse lookup of the IP address). Similarly, shared use client systems (e.g., client systems available to the public in a library) may be detected by analyzing the network access provider based on a reverse look-up of the client system's IP address (which may be captured with the beacon message).

The various modules 304a, 304b, and 304c of the measurement data processor 304 may implement various processes as describe below to generate adjusted measurement data for each category or class of device. The overlap processor 306 may implement one or more processes to combine the adjusted measurement data for the categories of devices in a manner that attempts to remove overlap of users between each category. The report generation module 308 may use the combined measurement data 306 to generate one or more reports 310 that include information regarding client system accesses of one or more resources.

Establishing Unique Visitors on Non-Mobile, Non-Shared Use Devices

Personal computing devices are conventional devices that generally have a small set of users. Personal devices may include both work computers and computers in the user's home. Personal computers, at least at present, are the most likely type of internet device to allow the user to install panel software, and are also the most likely to keep and hold cookies over long periods of time. For this reason, in some implementations, usage data for personal computing devices is based primarily on beacon data but refined using panel data and other factors as further described herein.

Figure 4:
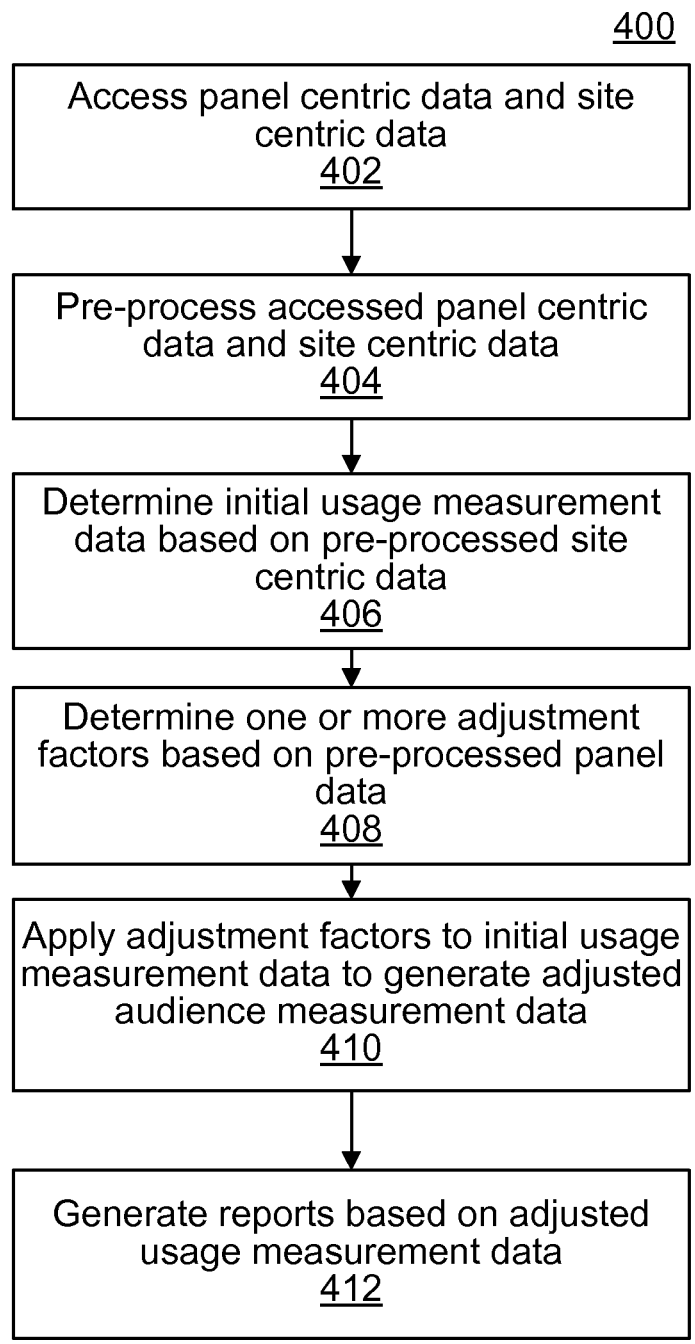
FIG. 4 is a flow chart illustrating an example of a process for determining audience measurement reports for a given web page or collection of web pages.

FIG. 4 is a flow chart illustrating an example of a process 400 for determining audience measurement reports for a given web page or collection of web pages. The following describes process 400 as being performed by the personal device module 304a. However, the process 400 may be performed by other systems or system configurations.

The personal device module 304a accesses the panel centric data 132a and non-mobile, non-shared use site centric data 132b (402) and perform some pre-processing of the accessed data (404). Pre-processing of both the accessed panel centric data 132a and the accessed site centric data 132b may involve delineating between classes of client systems. At times, it may be desirable to segment reports according to classes of non-mobile, non-shared use client systems. For example, in one implementation, the reports and underlying data, at least initially, are segmented into work vs. home client systems, with home client systems being those that are used at home while work client systems are those used at work. These two subpopulations can be identified and separated in the accessed panel centric data 132a because users self-identified the machines as home or work (or another class) when registering. To identify and separate these two sub-populations in the accessed site-centric 132b, the beacon messages received between 8 am and 6 pm local time Monday through Friday may be assumed to be work generated traffic. All other traffic may be aligned as targets for the Home sample.

In another example for identifying and separating these two subpopulations in the accessed site centric data 132b, a model may be developed based on observed work behavior in the panel centric data 132a. This model may be based on time of day and day of week usage profiles. If an IP address matches the expected profile for a work machine, all traffic for that IP address may be considered work traffic. For instance, panel data may indicate that, if the number of accesses during a first time period (a work time) is greater than the number of accesses during a second time period (a home time period) by a certain amount, then a machine is probably a work machine. This information may be used, together with the site-centric data, to classify network access providers into work or home based on the whether or not accesses by users of those network access providers are greater during the work time than the home time, on average, by the certain amount. The network access provider of a given machine may then be determined based on that machine's IP address, and that machine may be classified as the same class as the network access provider.

Actions 406 to 410 then may be separately performed on the data in each subpopulation, thereby generating measurement data for the home population and measurement data for the work population. Reports then may be generated for each of these subpopulations separately, or a combined reports may be generated, as further described with respect to action 412. Other implementations may similarly divide among several subpopulations.

The personal device module 304a determines initial usage measurement data based on the pre-processed site centric data (406). For example, the personal device module 304a may determine an initial measurement of unique visitors for a given media entity. Unique visitors may represent the number of unique people that requested and/or viewed one of the web pages of the media entity. To determine the initial measurement of unique visitors, for instance, the personal device module 304a may count the number of unique cookies (that is, number of cookies with a different unique identifier) received as part of the beacon messages received for the media entity.

As another example, the personal device module 304a may determine an initial measurement of page views for a given media entity. Page views may represent the number of times the web pages for a media entity were requested and/or viewed (regardless of whether the web pages were requested or viewed by a unique person). In this case, the personal device module 304a may count the total number of beacon messages received for the media entity.

The personal device module 304a determines one or more adjustment factors based on the pre-processed panel centric data (408). The initial audience measurement data, determined based solely on the pre-processed site centric data, may not be accurate for a number of reasons. The pre-processed panel centric data may be used to determine adjustment factors to correct the inaccuracies.

For example, if the initial measurement of unique visitors is based on cookies received with the beacon measurements, then there may be over or under counting of unique visitors because the cookies are set on a machine and browser basis, and not a person basis. In other words, even though multiple people may use a particular client system, only a single cookie may be set and counted for a given machine and browser. This may result in the undercounting of unique visitors.

In addition, a previously set cookie on a client system may be deleted, resulting in a new cookie and new identifier being set for further accesses during the reporting time period. As a result, accesses by the same user may be mistakenly identified as accesses from two different users, which may result in the overcounting of unique visitors. Similarly, a user may use multiple browsers, with different cookies being set for each browser. As a result, there may be multiple, different cookies for a single user because that user uses different browsers on the same machine. This may result in overcounting of unique visitors.

To account for such inaccuracies in the site centric data 132b, a cookie-per-person adjustment factor may be determined based on the pre-processed panel centric data. This adjustment factor may be determined on a media entity basis. This cookie-per-person adjustment factor may reflect the number of cookies that are set per person visiting beaconed web pages (that is, web pages that include the beacon code) of the media entity. As a result, this adjustment factor may be used to adjust the total count of unique visitors to compensate for multiple cookies per person or, conversely, multiple persons per cookie. This adjustment factor may be determined, for example, by using process 500 described with respect to FIG. 5.

Also, a given user may have and use multiple client systems in a given location (for example, at home). As a result, separate cookies may be set on the multiple client systems, and counted, even though only a single user is visiting the media entity. This may lead to an overcounting of unique visitors. To account for this inaccuracy, a machine overlap adjustment factor may be determined based on the pre-processed panel centric data. This adjustment factor may be determined on a media entity basis. This machine overlap adjustment may reflect the number of client systems being used per person that visits the media entity and can, therefore, adjust the total count of unique visitors to adjust for multiple cookies per person that result from a person using more than one client system to visit the media entity. This adjustment factor may be determined, for example, by using process 600 described with respect to FIG. 6.

Furthermore, if the initial measurement of unique visitors or page views is based on receiving a beacon message from beacon code included in the web pages for the media entity, there may be undercounting of either of these measurements as a result of beacon code not being included on all of the web pages for a given media entity. This may be the result of incorrect implementation of the beacon code (for example, the beacon code is not properly placed on all web pages that are part of the media entity), or not possible for certain policy reasons. For example, one lower level media entity may choose to include beacon code on all of the web pages for that media entity, while another lower level media entity may choose to not include beacon code at all. If those lower level media entities are underneath the same higher level media entity, then the beacon code can not be implemented on all of the web pages for the higher level entity since one of the lower level entities has chosen to not include beacon code. As a particular example, the MSN® website (msn.com) and the Hotmail® website (hotmail.com) may both be separate media entities under the higher level media entity designated as Microsoft®. However, these two websites may be separately operated and managed and, therefore, MSN®, for instance, may choose to beacon while Hotmail® does not. As a result, the initial audience measurement data (either page views or unique visitors) for the media entity Microsoft® does not include any counts for the Hotmail® webpages since Hotmail® does not include beacon code on the web pages for Hotmail®.

To account for inaccuracies in the page views or unique visitors that result from a failure to include beacon code in all of the web pages for a given media entity, a non-beaconed adjustment factor may be determined based on the pre-processed panel centric data. This adjustment factor may be determined on a media entity basis. Since, ideally, the panel applications capture all web traffic, visits to non-beaconed web pages for a given entity are also captured and reported by the panel applications. Thus, the pre-processed panel centric data may be used to determine a non-beaconed adjustment factor that reflects the number of page views or unique visits to web pages for the media entity that are not counted based on the beacon messages. This adjustment factor may be determined, for example, by using process 700 described with respect to FIG. 7.

The measurement adjustor module 304c applies the adjustment factors to the initial usage measurement data to generate adjusted usage measurement data 306 (410). For instance, in one implementation for audience measurement data that reflects unique visitors for a given media entity, the measurement adjustor module 304c may generate adjusted unique visitors data as follows:

Adj UVs=((Init UVs/Cookie-Per-Person)*Machine Overlap)+Non-Beaconed where Adj UVs is the adjusted unique visitors count, Init UVs is the initial count of unique visitors based on the pre-processed site centric data, Cookie-Per-Person is the cookie-per-person adjustment factor, Machine Overlap is the machine overlap adjustment factor, and Non-Beaconed is the non-beaconed adjustment factor. The reciprocal of the Cookie-Per-Person adjustment factor (a Person-Per-Cookie adjustment factor) may be used by multiplying this factor times the Init UVs, rather than dividing.

As another example, in one implementation for audience measurement data that reflects the total page views of web pages for a given media entity, the measurement adjustor module 304c may generate adjusted page views data as follows:

Adj PageViews=Init PageViews+Non-Beaconed where Adj PageViews is the adjusted page views count, Init PageViews is the initial page views count based on the pre-processed site centric data, and Non-Beaconed is the non-beaconed adjustment factor.

The report generation module 308 generates audience measurement reports based on the adjusted audience measurement data (412). For example, in an implementation in which the initial data is delineated between home and work client systems, the report generation module 308 may generate reports on unique visitors or page views for a given media entity for one or both of the home or work populations. Additionally, or alternatively, in such an implementation, the report generation module 308 may generate reports on unique visitors or page views for a given media entity that combine the home and work populations. In other words, the report generation module may combine the page views for the home and work populations into a combined count of page views and/or may combine the unique visitors for the home and work populations into a combined count of unique visitors.

In some implementations, when the report generation module 308 produces a combined count of unique visitors, the report generation module takes into account the number of users that are present in both the home and work populations. In some cases, a person may visit a web page for the media entity from both a home client system and a work client system. As a result, if the count of the user in the home population was simply added to the count of the user in the work population, then the user would be counted twice. The report generation module 308 may use panel centric data 132a to determine the amount of user overlap between the two populations, and remove duplicate counts. For instance, a number of users may install the monitoring application on both work client systems and home client systems, and designate each one as such. Therefore, the data resulting from these users can be used to estimate the number of people that visit the web pages for the media entity using both home and work client systems, and this information can be used to de-duplicate those users in the combined count of unique visitors.

Figure 5:
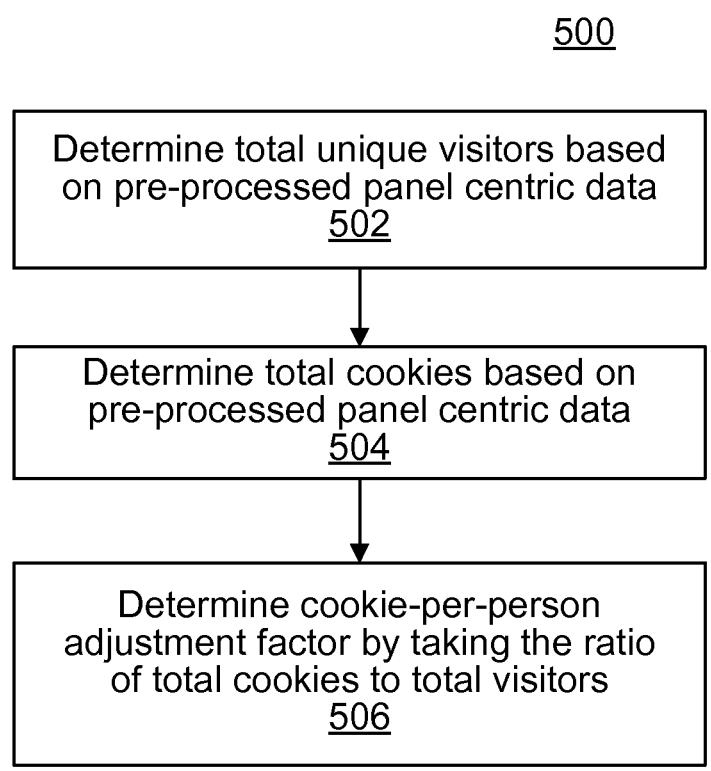
FIG. 5 is a flow chart illustrating an example of a process for determining a cookie-per-person adjustment factor.

FIG. 5 is a flow chart illustrating an example of a process 500 for determining a cookie-per-person adjustment factor. The following describes process 500 as being performed by the personal device module 304a. However, the process 500 may be performed by other systems or system configurations. As noted above, this adjustment factor may be used to adjust the initial audience measurement data for a given media entity. Thus, the following describes an implementation of process 500 in which the actions 502 to 506 are performed on a media entity basis.

The personal device module 304a determines, based on the pre-processed panel-centric data, a count of the total number of unique visitors that visited one of the beaconed web page of a given media entity (502). For instance, the total number of unique visitors may be determined by determining which members in the pre-processed panel have an associated beacon message as a result of visiting a web page of the media entity, and adding up the projection weights for each of these members. The projection weight for a given member may be the number of individuals that member represents in the total universe and, therefore, adding the projection weights for each of the determined members may provide the total number of individuals in the total universe that visited one of the beaconed web page of the media entity.

The personal device module 304a determines, based on the pre-processed panel-centric data, a count of the total number of beacon cookies for a given media entity (504). For example, the personal device module 304a may determine the client systems in the pre-processed panel centric data that accessed a beaconed web page of the media entity. For each of those client systems, the personal device module 304a may then determine the number of different cookies sent with the beacon messages (also referred to as "beacon cookies") from the client system during the reporting period. As described above, for client systems in which the panel application is installed, the panel applications can also record and report the beacon message and any associated cookie (beacon cookie). For each of those client systems, the personal device module 304a then may generate a projected cookie count for the client system by applying the projection weight for the user of the client system to the number of different beacon cookies sent by the client system during the reporting period. The personal device module 304a then adds the projected cookie counts together to determine a count of the total number of beacon cookies for the media entity. If there is more than one user of a given client system, the projection weights for those users may be averaged and the averaged weight may be applied to the count of different beacon cookies for that client system to determine the projected cookie count.

Once the total unique visitors and total cookies for a given media entity are determined, the personal device module 304a determines the cookie-per-person adjustment factor by taking the ratio of total cookies to total unique visitors. In other words, the personal device module 304a determines Cookie-Per-Person as:

Cookie-Per-Person=Total Cookies/Total Unique Visitors where Total Cookies is a count of the total number of beacon cookies for the media entity and Total Unique Visitors is a count of the total number of unique visitors for the media entity. As noted above, the reciprocal of the Cookie-Per-Person adjustment factor (Person-Per-Cookie) may be used. The Person-Per-Cookie factor may be determined by determining Total Unique Visitors/Total Cookies.

Figure 6:
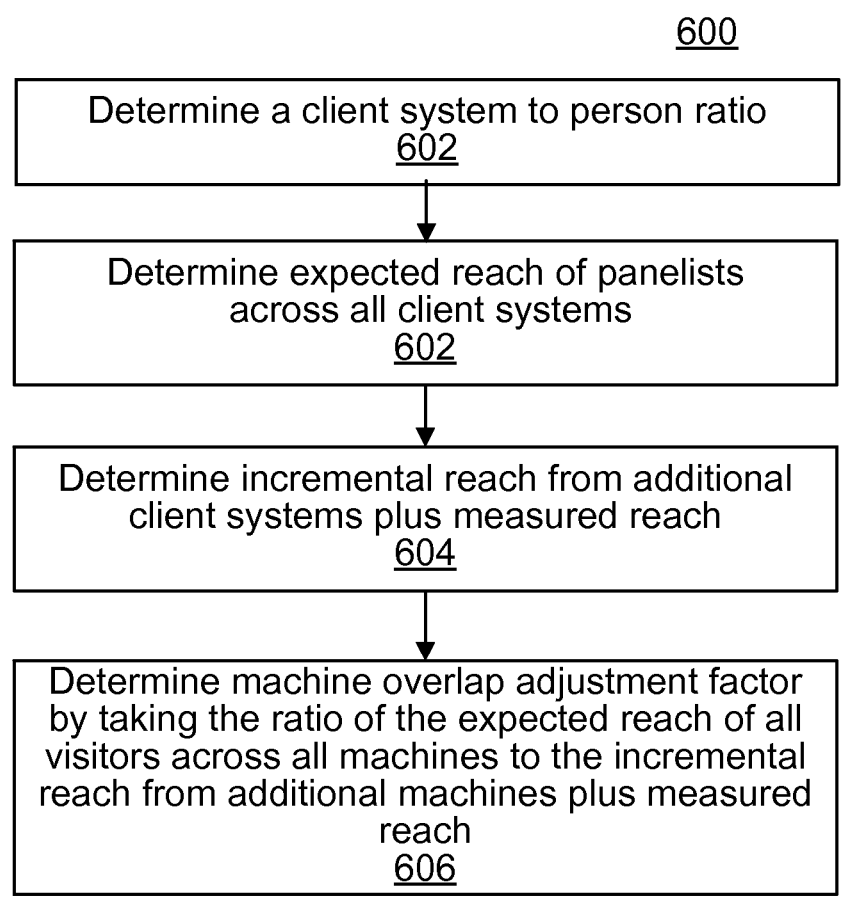
FIG. 6 is a flow chart illustrating an example of a process for determining a machine overlap adjustment factor.

FIG. 6 is a flow chart illustrating an example of a process 600 for determining a machine overlap adjustment factor. The following describes process 600 as being performed by the personal device module 304a. However, the process 600 may be performed by other systems or system configurations. As noted above, this adjustment factor may be used to adjust the initial audience measurement data for a given media entity. Thus, the following describes an implementation of process 600 in which the actions 602 to 606 are performed on a media entity basis.

The personal device module 304a determines, based on the pre-processed panel-centric data, a client system to person ratio for a given media entity (602). As described above, a given user may have and use multiple client systems in a given location (for example, at home). As a result, separate cookies may be set on the multiple client systems, and counted, even though only a single user is visiting the media entity. Based on the pre-processed panel centric data, a client system to person ratio for a given media entity can be determined for the entire universe of users and client systems being measured (e.g., the universe of all Internet users and client systems, or those in a particular geographic region). To determine the client system to person ratio for a given media entity, the personal device module 304a may determine the total number of client systems in the defined universe that accessed the web pages of the media entity and the total number of users in the defined universe that accessed the web pages of the media entity, and then determine the ratio of these two numbers.

As described above, there may be projection weights for projecting users to the total number of Internet users (or Internet users in a particular geographic region), or other defined user universe, as well as projection weights for projecting client systems to the total universe of client systems accessing the Internet (or, at least, the total in a particular geographic region), or other defined client system universe. Thus, to determine the total number of client systems in the defined universe that accessed the web pages of the media entity, the personal device module 304a may determine the client systems in the pre-processed panel centric data that accessed web pages of the media entity during the reporting period, and add up the projection weights for those client systems to determine the total number of client systems in the defined universe that accessed the web pages of the media entity. Similarly, to determine the total users, the personal device module 304a may determine the users in the pre-processed panel centric data that accessed web pages of the media entity during the reporting period, and add up the projection weights for those users to determine the total number of users in the defined universe that accessed the web pages of the media entity.

Based on the client system to person ratio, the personal device module 304a determines the expected reach based on all of the panelists in the pre-processed panel centric data across all of the client systems on which those panelists are active (604). In general, reach is the percentage of users, out of the total universe of users, that visited a web page of a given media entity during a certain period, such as the reporting period. In other words, reach is the percentage of the total possible visitors that visited a web page of the media entity.

The expected reach based on all panelists across all client systems on which they are active may be calculated using:

$$\frac{pRE}{1+(E-1)p^{\ln\left(\frac{E-1}{S-1}\right)/\ln(T)}}$$

Or $$\frac{(1+q)RE}{1+(E-1)(1+q)^{\ln\left(\frac{E-1}{S-1}\right)/\ln(T)}}$$

where:
p=the client system to person ratio, or $$\frac{M_p}{P_p};$$

q=the incremental number of client systems used by people=(p−1), assuming no shared use machines such that people use at least one machine;
T=the reporting period measured in days (e.g., 30 days);

R=the projected reach over the reporting period T;

E=the frequency of visitations per visitor to a web page of the media entity during period T;

S=the average visits to a web page of the media entity per day during period T.

The projected reach, R, over the reporting period T may be determined by using the pre-processed panel centric data to determine the projected number of users that visited a web page of the media entity during the reporting period and dividing that value by the total estimated universe of users. The frequency of visitations per visitor to a web page of the media entity, E, may be determined by using the pre-processed panel centric data to determine the total visits to a web page of the media entity during the reporting period and the total visitors to a web page of the entity during the reporting period, and then dividing those two numbers. The average page visits to a web page of the media entity per day, S, may be determined by using the pre-processed panel centric data to determine the total number of unique visits in each day of the reporting period, add these values together, and then divide by the total number of days in the reporting period.

Based on the client system to person ratio, the personal device module 304a determines the incremental reach not measured due to the client systems used by members of the panel, but not included in the panel plus the reach, R, measured by the panel (506). This expected reach gain from the incremental machine activity not measured by the panel can be determined using:

$$\frac{qRE}{1 + (E-1)q^{\ln(\frac{E-1}{S-1})/\ln(T)}}$$

This incremental reach can then be added to the measured reach, R.

The personal device module 304a determines the machine overlap adjustment factor by determining the ratio of the expected reach across all client systems to the incremental reach plus measured reach (508). In other words, the personal device module 304a may determine the machine overlap adjustment factor based on the following:

$$\frac{\frac{(1+q)RE}{1 + (E-1)(1+q)^{\ln(\frac{E-1}{S-1})/\ln(T)}}}{R + \frac{qRE}{1 + (E-1)q^{\ln(\frac{E-1}{S-1})/\ln(T)}}}$$

Which simplifies to:

$$\frac{\frac{(1+q)E}{1 + (E-1)(1+q)^{\ln(\frac{E-1}{S-1})/\ln(T)}}}{1 + \frac{qE}{1 + (E-1)q^{\ln(\frac{E-1}{S-1})/\ln(T)}}}$$

As an alternative to first calculating the expected reach, calculating the incremental reach plus measured reach, and then dividing the two, the personal device module 304a may determine the machine overlap adjustment factor based directly on the simplified equation above. For instance, the personal device module 304a may determine the client system to person ratio as described above, determine the incremental number of client systems used by people based on the machine to person ratio (e.g., by determining p−1), determine the frequency of visitations per visitor to a web page of the media entity as described above, determine the average visits to a web page of the media entity per day as described above, and then determine the machine overlap adjustment factor based on q, E, S, and T using the simplified equation above.

Moreover, if the composition of users and client systems in the defined universe is estimated accurately and taken into account correctly when determining projection weights for the users and client systems in the panel, then the client system to person ratio may be used directly as the machine overlap adjustment factor. However, such perfect estimating and weighting may be very difficult to accomplish. For instance, there may be a mix of primary (those used by a user most often to access the Internet) and secondary (those use less often) machines in the panel, but the exact mix may not be known. So, depending on the sample composition and the site, the client system to person ratio may be skewed more towards secondary usage or primary usage. To compensate for such errors, the client system to person ratio may be used as described above with the expected and incremental reaches to determine a machine overlap adjustment factor that compensates for the possible errors in estimating the universe and weighting. If the simplified equation above is used and the expected combined reach is greater than the addition of incremental reach to measured reach, the sample is skewed more towards secondary usage for the media entity and the machine overlap factor will scale up unique visitors. On the other hand, if the expected combined reach is less than the addition of incremental reach to measured reach, then the sample is skewed more towards primary usage and the machine overlap adjustment factor will scale down unique visitors to account for incremental secondary usage.

Figure 7:
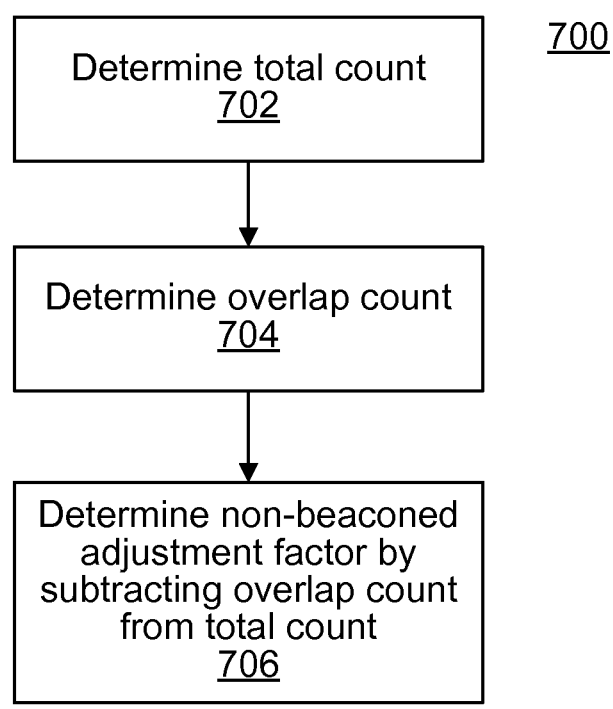
FIG. 7 is a flow chart illustrating an example of a process for determining a non-beaconed adjustment factor.

FIG. 7 is a flow chart illustrating an example of a process 700 for determining a non-beaconed adjustment factor. The following describes process 700 as being performed by the personal device module 304a. However, the process 700 may be performed by other systems or system configurations. As noted above, this adjustment factor may be used to adjust the initial audience measurement data for a given media entity. Thus, the following describes an implementation of process 700 in which the actions 702 to 706 are performed on a media entity basis.

The personal device module 304a, depending on the particular audience measurement, determines a total count of the unique visitors or page views for a given media entity based on the pre-processed panel-centric data (702). As described above, since, ideally, the panel applications capture all web traffic, visits to non-beaconed web pages for a given media entity are also captured and reported by the panel applications. As a result, the personal device module 304a may use the pre-processed panel data to determine a total count of the unique visitors or page views for a given media entity, even if all of the web pages for a media entity do not include beacon code.

For instance, the total number of unique visitors may be determined by adding up the projection weights for each of the members of the panel in the pre-processed panel centric data that visited a web page of the media entity. The total number of page views may be determined, for instance, by applying each member's projection weight to the count of page views for the member to generate a projected page views for the member, and then adding together all of the projected page views.

The personal device module 304a, depending on the particular audience measurement, determines an overlap count of the unique visitors or page views for a given media entity, based on the pre-processed panel-centric data (704). An overlap count of the unique visitors or page views are the number of unique visitors or page views attributable to visits to web pages that included the beacon code. To determine the overlap count of unique visitors, the personal device module 304a, for example, may add together the projection weights for members in the pre-processed panel centric data that visited a web page of the media entity and that sent a beacon message with a beacon cookie. To determine the overlap count of page views, the personal device module 304a, for example, may determine the members in the pre-processed panel centric data that visited a web page of the media entity and that sent a beacon message with a beacon cookie, determine the number of page views for each of those members, apply the projections weights for each member to the respective number of page views for the member to generate projected page views, and then add together the projected page views to obtain a total overlap count of page views.

The personal device module 304a, depending on the particular audience measurement, determines a non-beaconed adjustment factor by subtracting the total count of the unique visitors or page views for a given media entity from the overlap count of unique visitors or page views for the media entity (706). As noted above, the non-beaconed adjustment factor is used to adjust for the non-beaconed web pages. Thus, the overlap count is removed from the total count of unique visitors or page views (which includes unique visitors or page views for both web pages with beacon code and web pages without beacon code) to arrive at an adjustment factor that reflects unique visitors or page views attributable only to those web pages of the media entity that do not contain beacon code. In other words, Non-Beaconed is determined based on:

Non-Beaconed=Total Count−Overlap Count where Total Count is the projected total count of unique visitors or page views for the media entity (for both beaconed and non-beaconed pages) based on the pre-processed panel centric data and Overlap Count is the projected count of unique visitors or page views attributable to web pages of the media entity that include beacon code.

The above techniques are used on usage data which is understood to represent personal computing devices, such as work and home computers. Once a count for unique visitors is determined for personal computing devices, this count is used along with other usage data in order to arrive at a total count of unique visitors over all devices as further described below.
Establishing Unique Visitors on Mobile Devices Internet usage is not confined to home and work personal computers. Increasingly, mobile devices form an important component of the internet audience that a business may wish to measure.

Mobile devices may, in some cases, provide unique challenges to determining a count for unique visitors. The methods described rely on the use of cookie beacons and usage data based on beacon information. However, many mobile device platforms are unreliable in their acceptance and maintenance of cookies. For example, some mobile device platforms include internet browsers that refuse third-party cookies, and many have default settings that either refuse cookies or clear them quickly. This makes it more difficult to collect internet usage data that is measured, for instance, on a monthly basis.

In some implementations, mobile usage data will be collected both for devices having beacon cookies and for devices without cookies. For mobile devices without cookies, the device's IP address may be used to uniquely identify access by the device.

Figure 8:
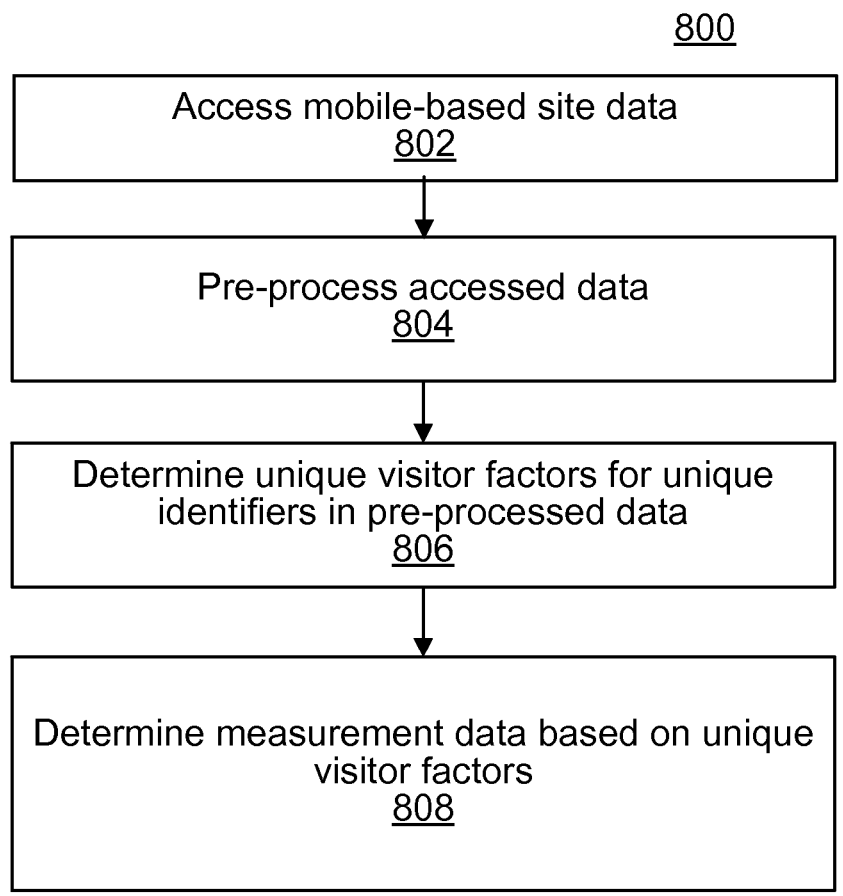
FIG. 8 is a flow chart illustrating an example of a process for determining measurement data for mobile devices.

FIG. 8 is a flow-chart illustrating an example of a process 800 for determining measurement data for mobile devices. The following describes process 800 as being performed by the mobile device module 304b. However, the process 800 may be performed by other systems or system configurations.

The mobile device module 304b accesses mobile-based site-centric data (802) and may perform some pre-processing (804). The pre-processing may include standardizing data if any of the servers use nonstandard formats, consolidating data from multiple sources, and eliminating or reclassifying data that does not fit with the remainder of the process. In some implementations, as part of pre-processing the usage data, data associated with mobile applications may be removed. This data may be processed separately as described further below.

The pre-processed data may include records with unique identifiers and, for a given unique identifier, information indicating each time a tracked resource was accessed (that is, each "hit"), along with a time stamp associated with each hit. When beacon cookies were include in the beacon messages, then the unique identifiers in the beacon cookies can be used. If a beacon cookie was not present, then a network identifier, such as an IP address, may be used as the unique identifier.

Once the data is pre-processed, the mobile device module 304b determines a unique visitor factor for each entry associated with a unique identifier (806). The unique visitor factor acts as an adjustment factor for unique identifiers that are not suitable for interpreting 1-for-1 as unique visitors. In general, under certain circumstances, a unique identifier can be considered to correspond to one person. As a result, an access of a resource associated with that unique identifier can be considered an access by one unique person. However, under certain circumstances, this assumption is not appropriate. For example, because many mobile device platforms are unreliable in their acceptance and maintenance of cookies, a given user may receive more than one cookie over a certain reporting time period (for example, one month) and, as a result, may be counted as more than one person. As a result, it may be appropriate to count such cookies as less than a person when determining unique views. As another example, IP addresses may be assigned to different people over the course of the reporting period. As a result, a given IP address may only be counted as one person when, in fact, it represents more than one person. As a result, it may be appropriate to count such IP addresses as more than a person when determining unique views In order to account for such circumstances, a consideration set of unique identifiers is developed and used to determine unique visitor factors for each unique identifier to act as adjustment factors. The consideration set is populated with those unique identifiers that have a high probability of corresponding to a single person. In one implementation, the consideration set is populated with unique identifiers that correspond to cookies that are present in the data over a duration that exceeds a persistence threshold. In other words, the consideration set corresponds to cookies that are present for a threshold amount of time during the reporting period. An example of a process for determining unique visitor factors is described below in conjunction with FIG. 9.

The measurement data is then determined based on the unique visitor factors (808). In some implementations, the unique factors can be summed over a set of data in order to arrive at a number of unique visitors. All the unique visitors factors associated with records meeting a particular criterion can be added up to determine a unique visitor count for that criterion. For example, the unique visitor factors for each record of a device accessing a particular media entity can be summed to a total number of unique visitors to that media entity.

Figure 9:
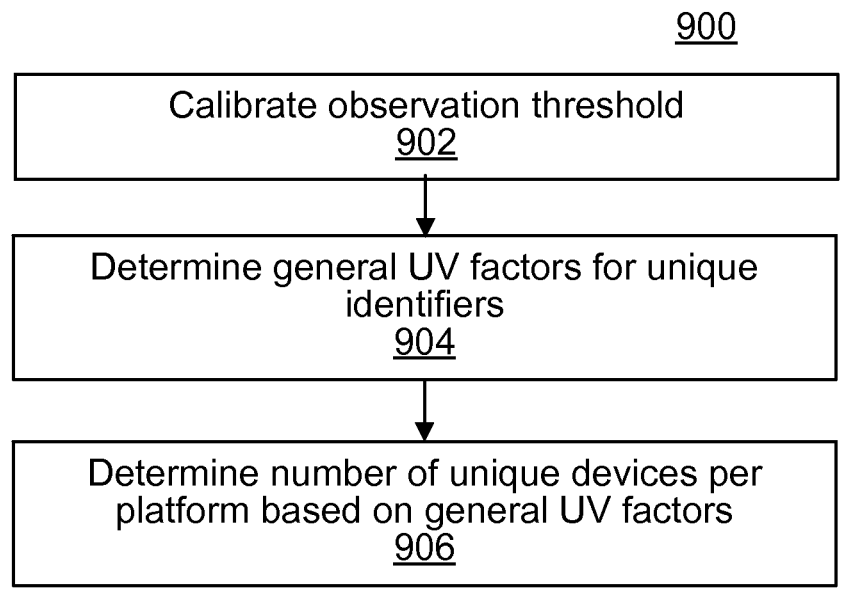
FIG. 9 is a flow chart illustrating an example of a process for assigning general unique visitor factors to mobile device usage data.

FIG. 9 is a flowchart illustrating an example of a process 900 for determining general unique visitor ("UV") factors for unique identifiers and using those to determine the number of devices per platform. Generally, the process involves defining a consideration set represented by persistent cookies—those cookies for which the record of activity exceeds a threshold. This data is used to evaluate the remainder of the data, which includes non-persistent cookies and persistent or non-persistent IP addresses.

The mobile device module 304b calibrates an observation threshold (902). The observation threshold may not be calibrated every time; in some implementations the threshold may be calculated off-line and only adjusted at a set interval, such as annually, even if other steps of the process 900 are carried out for each measurement period, such as monthly.

In some implementations, the calibration may involve comparing the data to some further external source that estimates the number of unique devices per platform. The data may be sorted or categorized to match the external source. For example, in some implementations, the data may include mobile devices from several different mobile platforms. Each platform represents a different basic software framework developed for mobile use, and includes a mobile device's operating system. The mobile device module 304b sorts the usage data according to the platform of the mobile device and compares the usage data to a source that gives an estimate of the number of unique devices per platform.

The mobile device module 304b may iterate through different observation thresholds until it finds one where the formula for calculating UVs based on categorizing the data into persistent and non-persistent records, as further described below, gives results that most closely match the estimated data. In other words, the mobile device module 304b may perform actions 904 and 906 using different values for the observation threshold to arrive at different counts for unique devices per platform. The mobile device module 304b may then select the observation threshold that results in the count of unique devices per platform to most closely match the external source for unique devices per platform. For example, the mobile device module 304b may calculate unique devices per platform based on an observation threshold of 5 days, 10 days, 15 days, and 20 days, and find that unique devices per platform calculated based on a 20-day observation threshold matches the estimated data more closely than the others. The mobile device module 304b may then calculate unique devices per platform based on observation thresholds of 20, 22, 24, and 26 days. Upon determining that an observation threshold of 24 days results in the closest match to the estimated data, 24 days may be used as the observation threshold (or "obs_threshold").

The mobile device module 304b determines general UV factors for unique identifiers (904). Using the example of 24 days, the data is sorted based on its persistence and the presence or absence of a beacon cookie. Persistent cookies or IP addresses are those that include events over a longer period of time than the threshold. In some implementations, the difference in days between the most recent and the oldest time stamp associated with a cookie or IP address may be compared against a threshold, such as 24 days, such as by the use of the following equation:

$$days\_obs = newest\_stamp - oldest\_stamp$$

If the cookie's or IP address's timestamps span a duration equal to or exceeding the threshold, for example if the oldest stamp is at least 24 days older than the newest stamp, then the cookie may be classified as persistent. This yields four classes of data: persistent cookie data, non-persistent cookie data, persistent IP data, and non-persistent IP data. The following can be used to calculate the UV factor for each category.

| | |
|---|---|
| Persistent Cookie Data<br>Cookie = TRUE<br>days_obs >= obs_threshold | UV = 1 |
| Non-Persistent Cookie Data<br>Cookie = TRUE<br>days_obs < obs_threshold | UV = MIN (days_obs / obs_threshold, hits / PCI) |
| Persistent IP Data<br>Cookie = FALSE<br>days_obs >= obs_threshold | UV = MAX (1, hits / PCI) |
| Non-Persistent IP Data<br>Cookie = FALSE<br>days_obs < obs_threshold | UV = MAX (1, hits / PCI) *<br>(days_obs / obs_threshold) |

The first category, persistent cookie data, may act as a consideration set and provide a baseline for the other categories. The UV factor for unique identifiers in this class is set to 1. That is, each cookie is considered to represent one unique visitor. In some implementations, the average number of hits per cookie for the data in this category is used to evaluate data in the other categories to set the UV factor. The average hits per cookie for data in the persistent cookie data category is referred to as the persistent cookie intensity, or "PCI".

The second category, non-persistent cookie data, may result in over-counting unique visitors if a UV factor is not applied. For example, a mobile device could clear and re-install cookies once a week, in which case one user may have accessed a resource with each of four different cookies. Ideally, each of these cookies is counted as only a fraction such that all of the cookies associated with one individual end up totaling to 1 in the UV count. This can be accounted for by setting the general UV factor to the minimum value of either the ratio of the days observed for the particular cookie (that is, the difference in days between the last and the first time stamp) and the threshold number of days to be considered persistent (days_obs/obs_threshold) or the ratio of the hits from the particular unique identifier to the persistent cookie intensity (hits/PCI).

For IP address records (the third and fourth categories), multiple users may use the IP address over a month, which can result in under-counting. For example, several mobile devices connected through a wireless router may be considered to have the same IP address. Furthermore, many 3G and other mobile data services use floating IP addresses that may be assigned to several users over the course of the month. To compensate, the level of activity associated with the IP address may be used as a proxy for the number of individuals using it.

In particular, for persistent IP data (the third category), if a particular IP address had more hits than the average number of hits for persistent cookie data (that is, the persistent cookie intensity), then that IP address is assigned a UV factor of greater than 1 according to the ratio that it exceeds the PCI. In other words, the UV factor is set to the maximum value of either 1 or the ratio of hits from the particular IP address to the persistent cookie intensity (hits/PCI). For non-persistent IP data (the fourth category), the same formula is used, except that the UV factor is multiplied by a factor reflecting how short-lived the record is.

In some implementations, the above formulas may use the data specific to each platform. Particularly, the data may be segregated by platform and the UV factors calculated for each platform. In some implementations, persistent cookie data for each platform may be used to calculate a PCI that is specific to that platform, which is then used in determining the UV factor for the other classes of data for that platform.

The mobile device module 304b determines the number of unique devices per platform based on the general UV factors (906). For instance, the general UV factors for each platform can be summed to arrive at a total count of devices for that platform.

Figure 10:
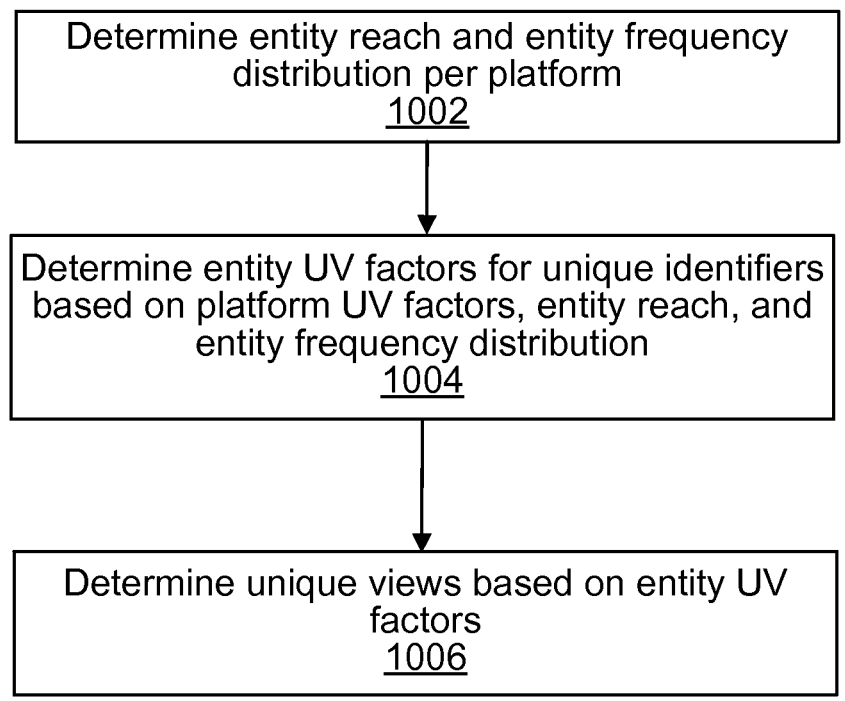
FIG. 10 is a flow chart illustrating an example of a process for calculating entity unique visitor factors.

FIG. 10 is a flowchart illustrating an example of a process 1000 for determining unique views for a resource or set of resources (generally referred to as an entity, as explained above). Generally, process 1000 involves determining an entity UV factor for each unique identifier that visited a given entity based on the general UV factors and the reach/frequency of the entity. The following describes process 1000 as being performed by the mobile device module 304b. However, the process 1000 may be performed by other systems or system configurations.

For a given entity represented in the mobile usage site-centric data, the mobile device module 304b determines an entity reach and a hit frequency distribution per platform (1002). The entity reach and hit frequency distribution is determined using the persistent cookie data. The entity reach can be determined as follows:

entity reach=(cookies per entity/total cookies over all entities)

where the cookies per entity is a count of the number of unique identifiers that accessed the entity and the total cookies over all entities is a count of the all the unique identifiers in the persistent cookie data. For example, if 80% of all persistent cookies have at least one hit on a given website, the reach for that entity will be 0.8.

The mobile device module 304b may also determine the hit frequency distribution for the entity for each platform. This represents the fraction of persistent cookies recording a particular number of hits for the entity, according to the persistent cookie data. For a particular platform and entity, a frequency distribution may look like this:

| | |
|---|---|
| 1 hit | 0.8 |
| 2 hits | 0.1 |
| 3 hits | 0.05 |
| 4 hits | 0.02 |
| 5 or more hits | 0.03 |

The entity reach and frequency distribution are both used in order to determine an entity UV factor for unique identifiers that do not correspond to persistent cookies (1004). For example, the following may be used to determine the entity UV for each unique identifier for a given entity:

| | |
|---|---|
| Persistent Cookie Data<br>Cookie = TRUE<br>days_obs >= obs_threshold | entity UV = 1 |
| Persistent IP Data<br>Cookie = FALSE<br>days_obs >= obs_threshold | entity UV = MAX (1, general UV factor * reach) |
| Non-Persistent Cookie Data<br>Cookie = TRUE<br>days_obs < obs_threshold | entity UV =<br>{IF general UV factor >1, general UV factor * reach<br>IF general UV factor <= 1, MAX (general UV factor, entity frequency) |
| Non-Persistent IP Data<br>Cookie = FALSE<br>days_obs < obs_threshold | entity UV = MAX (general UV factor, entity frequency) |

The general UV factor is the general UV factor described above and, when appropriate, is scaled by the reach to achieve the entity UV factor. The entity frequency refers to the hits frequency found in the frequency distribution for the particular entity and platform corresponding to the unique identifier. For example, a non-persistent cookie or IP with 3 hits would, based on the above example of a frequency distribution, have an entity frequency of 0.05.

The mobile device module 304b determines the number of unique web views (or accesses), as opposed to mobile app accesses, to the entity based on the entity UV factors (1006). For instance, the entity UV factors for each platform can be summed to arrive at a total count of unique views per platform, and then those unique views per platform can be summed.

Figure 11:
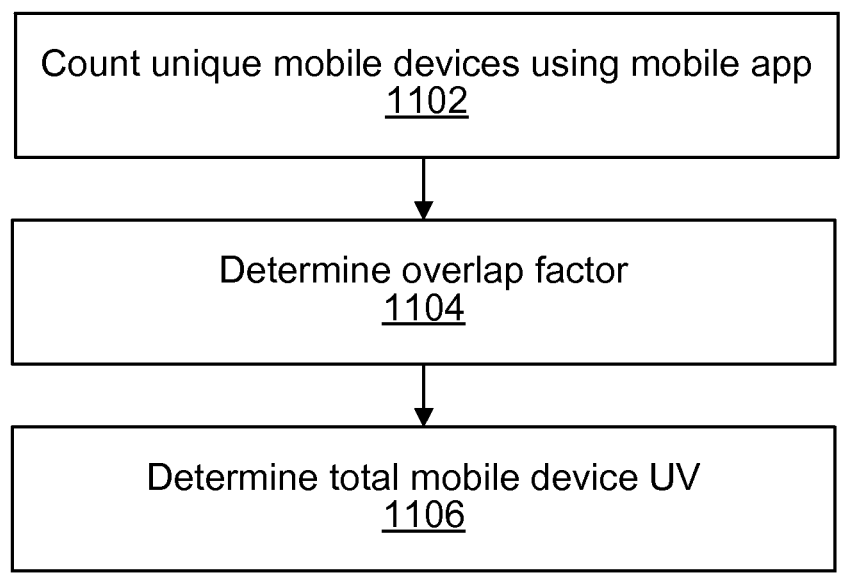
FIG. 11 is a flow chart illustrating an example of a process for measuring the total audience for mobile devices.

FIG. 11 is a flowchart illustrating an example of a process 1100 for determining total mobile unique views for an entity. Generally, in process 1100, entity accesses by mobile apps is added to the count of mobile web views in order to measure the total audience for mobile devices. The following describes process 1100 as being performed by the mobile device module 304b. However, the process 1100 may be performed by other systems or system configurations.

The mobile device module 304b counts the number of unique mobile devices using the mobile app to access the entity (1102). Referring briefly to FIG. 2, each mobile app 210 may have access to a unique device identifier for the mobile device upon which it resides and that device identifier may be returned in a beacon call. Therefore, the mobile device module 304b may count the number of unique mobile devices using the mobile app by counting the number of unique device identifiers recorded as having visited the entity. In some cases, the device identifiers are uniquely and permanently assigned to the device, so the issues related to mobile web views and cookies do not apply. As a result, in those circumstances, it may be assumed that each device identifier corresponds to one person.

The mobile device module 304b determines an overlap factor between the mobile web and mobile app accesses is determined (1104). While it may be appropriate to assume a unique device identifier corresponds to a single person, that person may nevertheless also have accessed the entity via the web page and, in a count of unique visitors, would be counted twice. The overlap factor may be used to take into account such overlap of visitation.

Figure 14:
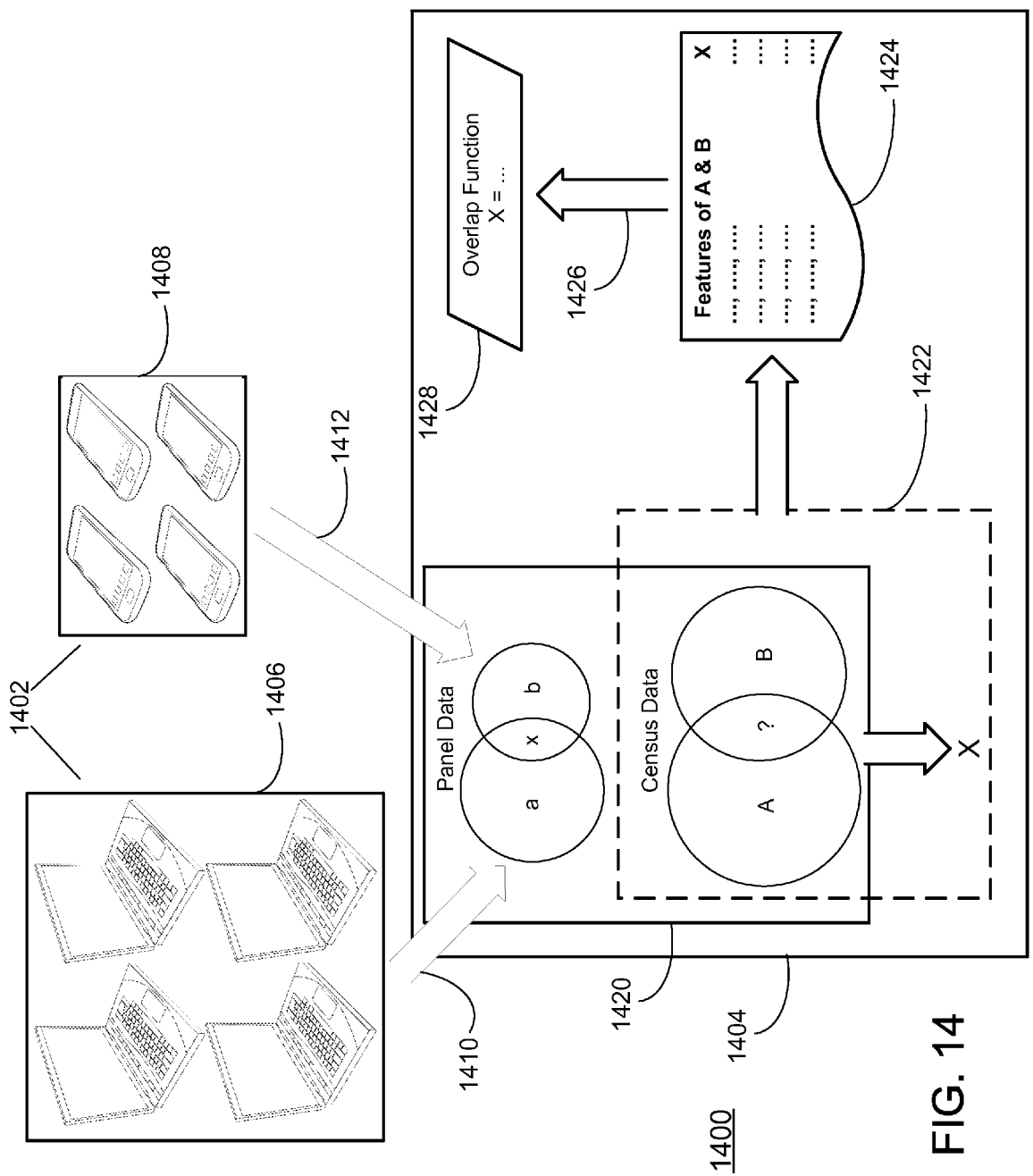
FIG. 14 illustrates an example of a system in which panel and census data are used to estimate overlap across multiple platforms.
Figure 15:
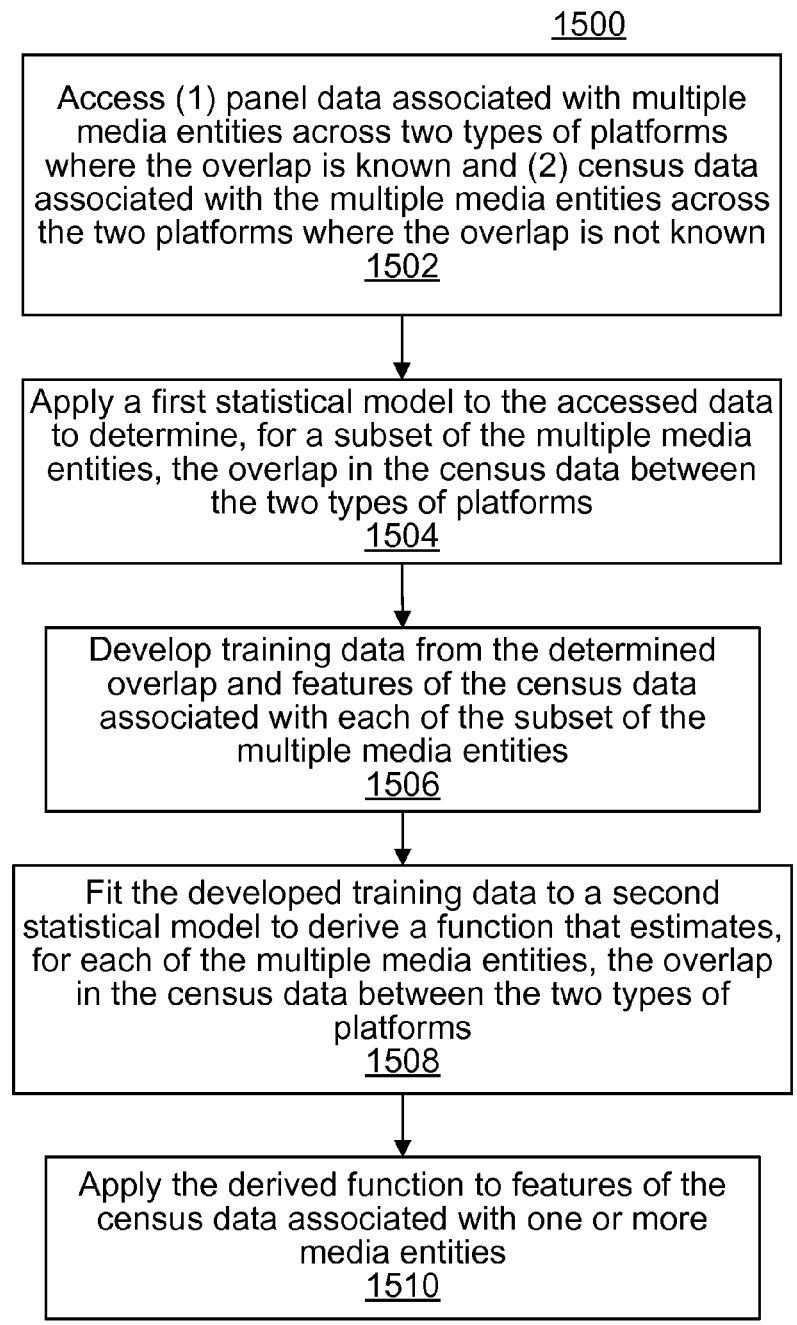
FIG. 15 is a flow chart illustrating an example of a process for developing an overlap function that estimates the overlap in the census data for accesses by two platforms to the media content associated with a media entity.

For instance, the overlap factor can be calculated as described with respect to FIGS. 14 and 15.

The mobile device module 304b determines the total mobile unique views for the entity (1106). For instance, the following formula may be used to apply the overlap:

Mobile UV=Mobile Web UV+(1−Overlap Factor)*Mobile App UV

The above techniques are used on usage data which is understood to represent mobile devices, such as smart phones and tablet computers. Once a count for unique visitors is determined for mobile devices, this count may be used along with other usage data in order to arrive at a total count of unique visitors over all devices as further described below.

Establishing Unique Visitors on Shared Use Computers

In addition to personal computing devices and mobile devices, internet use also occurs on computers made available to members of the public to use on a short-term basis. Libraries, community centers, and internet cafes among other locations provide internet use that, in some countries, represents a significant fraction of the internet audience.

In measuring unique visitors for shared devices, a basic assumption that equates the number of devices with the number of users may be inapplicable here. A particular shared device may have several unique users each day and a user is likely to use multiple shared use devices during a reporting period.

Figure 12:
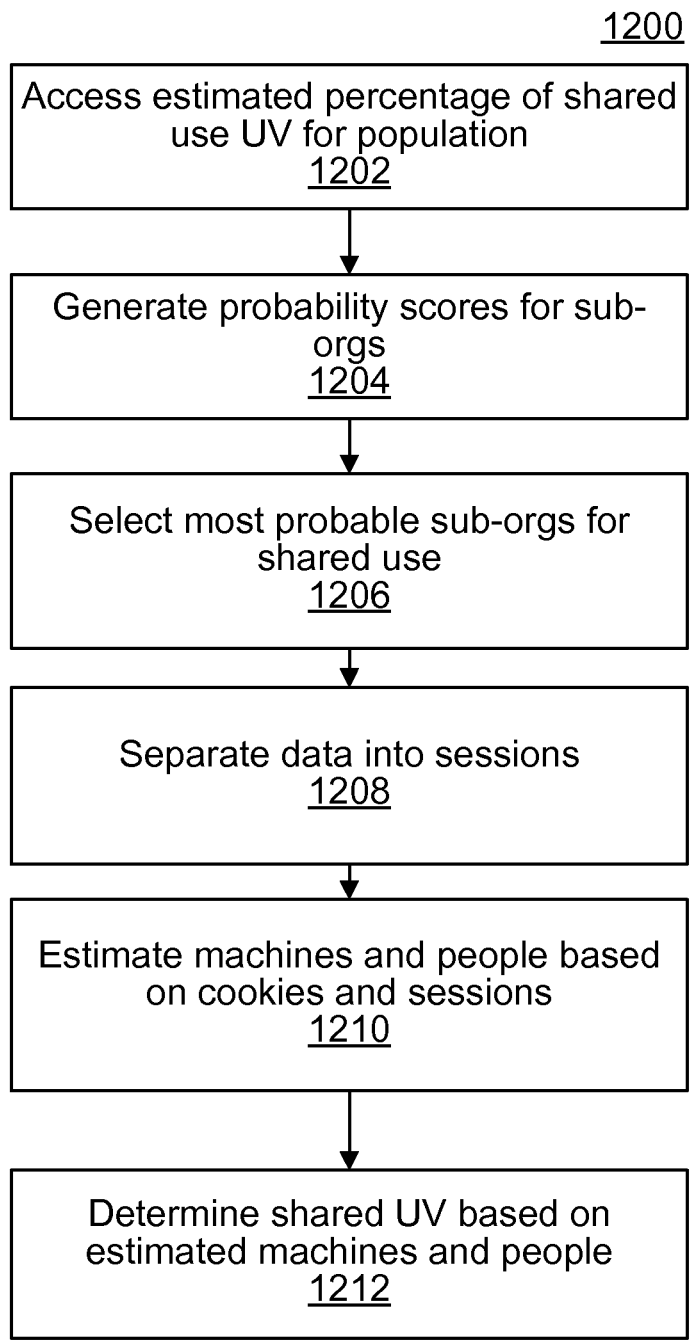
FIG. 12 is a flow chart illustrating an example of a process for identifying and measuring shared device usage data.

FIG. 12 is a flowchart illustrating an example of a process 1200 for identifying and measuring shared use device activity. The following describes process 1200 as being performed by the shared use module 304c. However, the process 1200 may be performed by other systems or system configurations.

The shared use module 304c accesses an estimated percentage of unique visitors that should come from shared use devices within the population being measured (1202). This information may come from an external source, such as a survey or other separate means of measuring audience data. The data may be based on the relevant population for which the shared device usage data is to be measured; for example, the relevant population may be usage data associated with a given country. In other words, the estimated percentage may represent the estimated fraction of the total unique views for a given population, such as a country or region, that is expected to come from shared use devices. The estimated percentage may be estimated by survey data, from the use of a consideration set, or may be set dynamically based on other data interactions within the system.

The shared use module 304c divides the usage data according to IP address. Each IP address block of the two or three most significant octets in the IP address, referred to as a "sub-org", is analyzed to see if the usage data has characteristics of shared use.

Each sub-org is assigned a probability to determine whether it contains activity from shared devices (1204). The name of organizations possessing IP addresses in a block (such as "café", "university", or "library") may indicate shared use activity and may be used to establish a baseline for typical shared use behavior at the level of the address block. The level of activity during different times of day may indicate shared use activity; for example, a higher usage outside of office hours and on weekends may be indicative of shared devices. Also, cookies that refresh very frequently and are assigned more frequently may indicate a higher probability of shared use activity.

The sub-orgs are sorted based on a scored probability of being shared use, and the most probable are selected as shared use (1206). In some implementations, such as identifying a percentage of users who are shared-use only users, the accessed estimated percentage of unique visitors that should come from shared use devices is used in order to determine how many sub-orgs to identify and analyze as shared use. The most probable sub-org may be classified as shared use until the percentage of usage data represented by the classified sub-orgs matches the enumerated percentage for shared use. Alternatively, in some implementations, probabilities are compared against a threshold value, and all those sub-org probabilities above the threshold value are identified as the shared device usage data.

The shared device usage data corresponding to the sub-orgs classified as shared use is separated into sessions (1208). Sessions represent a window of time during which it is reasonable to estimate a single person may have used each machine in a shared use establishment. For example, each window may represent one hour of time, and so usage data is segmented according to the hour of the day in which it occurred.

The system uses the unique identifier present in the cookie data, separated into sessions, in order to estimate the total number of machines available for a particular location (for example, library or café), and a number of people that used those machines over a given period (1210). The number of machines is estimated by counting the number of cookies during any single session; the highest number of cookies recorded during a single session in a measurement period is considered to be the number of machines available for a particular shared use computer. The number of people is estimated by counting, for each session during a given period, the total number of cookies recorded during each session, and summing those cookies over the whole period. In some implementations, the period may be a day, and the sessions may each represent one hour of the day.

The estimated numbers of machines and persons can be used in conjunction with a projected reach-frequency equation in order to determine a number of unique visitors (1212). For instance, this may be accomplished by comparing intensity on the first day of the month to intensity over the whole month, using for example the following equation:

$$UV=Hits/(1+E_p*P\hat{}(\ln(E_p+1)/(S_p+1))/\ln(30))$$

The variable P in the above equation is a factor identifying the relationship of overall machine consumption to the consumption for a single person, as further described by the following equation:

$$P=(1+S_m*15\hat{}(\ln((E_m-1)/(S_m-1))/\ln(30)))/(1+S_p*15\hat{}(\ln((E_p-1)/(S_p-1))/\ln(30)))$$

Wherein $E_p$ represents the hits per person averaged over the entire month, $S_p$ represents the hits per person measured on the first day of the month, $E_m$ represents the hits per machine measured across the entire month, and $S_m$ the hits per machine estimated on the first day of the month.

For each identified location, which as described may be inferred based on the use of an IP address block with similar usage patterns, the above estimate and equation can be used to generate a shared device UV. When aggregated with the unique visitors measured at other locations, the result can be used to represent shared device unique visitors over the whole population.

The above techniques are used on usage data which is understood to represent shared use devices. Once a count for unique visitors is determined for shared devices, this count is used along with other usage data in order to arrive at a total count of unique visitors over all devices as further described below.

Combining Categories

Figure 13:
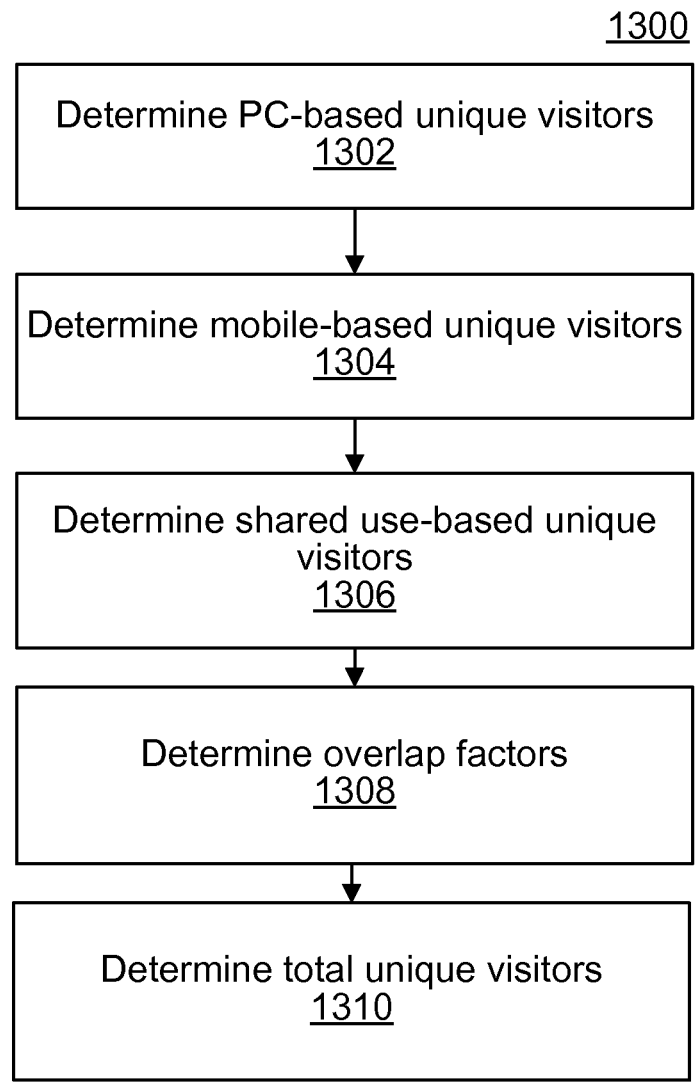
FIG. 13 is a flow chart illustrating an example of a process to combine unique visitors measured for different classified devices to produce a total count of unique visitors.

FIG. 13 is a flow-chart illustrating an example of a process 1300 for determining the total unique visitors to a given entity. Generally, process 1300 involves combining the unique visitors to the entity measured for different classified devices to produce a total count of unique visitors. The following describes process 1300 as being performed by the overlap processor 306. However, the process 1300 may be performed by other systems or system configurations.

The overlap processor 306 determines a count of the unique visitors to the entity using personal computing devices (1302). The primary source of data, as described above, may be based on client devices responding to beacon instructions. The count may proceed according to the details explained above, and may generally be corrected or calibrated by the use of panel data as described herein.

The overlap processor 306 determines a count of unique visitors to the entity using mobile devices (1304). This data may be determined using the techniques described above. For instance, this data may be based on unique identifiers representing both cookies and IP addresses, both short-lived and persistent. Persistent cookies may be used to evaluate the rest of the data as described herein. Mobile app data may be removed in pre-processing and re-aggregated with mobile web data near the end of the process.

The overlap processor 306 determines a count of unique visitors to the entity using shared use devices (1306). This data may be determined using the techniques described above. For instance, this data may be based on usage segmented into sessions in order to estimate usage patterns for each location. A variety of factors may be used to identify which usage data should be attributed to shared use devices and evaluated by this method.

Having determined personal device UV, mobile device UV, and shared device UV, the overlap processor 306 then works to identify overlap factors between these three categories of use (1308). The total unique visitors to report for the whole population can then be determined by aggregating the different device UVs adjusted according to the overlap factors (1310).

Different processes are available for estimating overlap and aggregating unique visitors across different platforms. One set of techniques for calculating overlap is described below with regard to FIGS. 14-18.

FIG. 14 illustrates an example of a system 1400 in which panel and census data are used to estimate overlap across multiple platforms. The system 1400 includes a panel 1402 and a collection server 1404. Panel 1402 includes a first group of a first type of platforms 1406 and a second group of a second type of platforms 1408. The panel 1402 may include any number of groups of different types of platforms. Moreover, the groups may include any number of platforms, and the type of platforms in each group may include any apparatuses or systems through which a member of the panel accesses media (e.g., personal computers, mobile devices, and/or televisions). For example, panel 1402 may include a group of personal computers 1406 and a group of mobile devices 1408.

As described above, a panel is a group of platforms that are a sample of the larger universe of platforms being used to access media resources. As a result, the behavior on a machine basis or a person basis, can be projected to the universe of all client systems accessing resources on the Internet to determine census data. The census data representing the total universe of such platforms may also be determined, for example, using independent measurements or studies, such as the above-described beacon method. The panel 1402 may be any actual or estimated sample of the larger universe of platforms, as long as the number and type of platforms used by each member of the panel 1402 is known.

With regard to the site centric data 132b described above, for example, the panel 1402 may be estimated from a subset of the site centric data 132b. For example, collection server 1404 or another component of system 1400 not illustrated, may determine which site centric data is associated with single user households that use one platform from the first group 1406 and one platform from the second group 1408. For each of these single user households, the collection server 1404 will be able to determine the overlap directly from the site centric data 132b associated with each single user household.

However, any panel that includes data for the multiple platforms represented within system 1400 may be used. For example, system 1400 may employ a panel that relies on monitoring applications such as the one described above with regard to FIG. 1. The panel 1402 is selected to be a sample of a larger universe of users or platforms being measured. Therefore, the panel 1402 may be any sample, whether directly observed or derived.

For the sake of simplicity, the panel 1402 will be described with regard to the single user households determined from the site centric data 132b to use one platform from the first group 1406 and one platform from the second group 1408. Again, for the sake of simplicity, the first type of platforms included in the first group 1406 will be described as personal computers and the second type of platforms included in the second group 1408 will be described as mobile devices. In this example, the users in the personal computers and mobile devices access webpages via the Internet. Thus, in this example, the panel data 1410 associated with the first group 1406 includes information about websites visited via the personal computers in the first group 1406. Similarly, the panel data 1412 associated with the second group 1406 includes information about websites visited via the mobile devices in the second group 1406. However, the platforms in the first group 1406 and the second group 1408 may be any type of platforms.

Media content accessed on one type of platform may be related to media content accessed on another type platform in a number of different ways. For example, one or more of the webpages accessed by mobile devices may have specialized addresses for mobile content that differ from the addresses associated with the same or similar content accessed on personal computers. For example, a webpage being accessed by a personal computer may be provided by the same media entity as a webpage accessed by a mobile device, but the addresses and layouts may be different across the two platforms. Where a third type of platform included in the panel 1402 is televisions, the media content being accessed by the televisions may include television programs. Though television programs are a different form of media content from the webpages accessed by the personal computers and mobile devices, the content of the media may still be related. For example, the Monday Night Football® television program may be related to some or all of the ESPN® and/or Sports Illustrated® webpages. Collection server 1404 may include one or more dictionaries for relating media across the multiple platforms.

As mentioned previously, the overlap in accesses to related media for the panel data is a known quantity, because the collection server has all of the access data for the entire panel 1402 and can correlate the access data to the member's performing each media access. However, in order to determine the overlap in accesses to related media content for census data projected from the panel data, the collection server 1404 may be configured to carry out various processes to estimate the overlap, examples of which will now be described.

The collection server 1404 may organize the panel data 1410 for the personal computers included in first group of platforms 1406 and the panel data 1412 for the mobile devices included in the second group of platforms 1406 may be organized according to media entity. As shown in FIG. 14, the circle in the Venn diagram of panel data labeled 'a' may denote the number of single user households in the panel 1402 who accessed media content associated with a first media entity on a personal computer included in group 1406 during a period of time. The circle in the Venn diagram of panel data labeled 'b' may denote the number of single user households in the panel 1402 who accessed media content associated with the first media entity on a mobile device included in group 1408 during the period of time.

The region of the Venn diagram labeled 'x', where the circle 'a' overlaps with the circle 'b', indicates single user households that have accessed media content associated with the first media entity on a personal computer in group 1406 and have also accessed media content associated with the first media entity on a mobile device in group 1408 during the period of time. As described above, the collection server 104 may determine the values represented by 'a', 'b', and 'x' directly from the site centric data 132b associated with the single user households that use one platform from the first group 1406 and one platform from the second group 1408.

FIG. 14 also illustrates census data for the same set of platforms as in the panel data. The census data may be any set of collected or projected data representing accesses by the members of the larger universe to be measured. In some implementations, for example, the census data may be all of the site centric data 132b determined to represent unique visitors based on the processes described above. Thus, for each media entity, the circle in the Venn diagram of census data labeled 'A' may denote the number of people in the larger universe being measured who accessed media content associated with a second media entity on a personal computer included in first group 1406 during a period of time. The circle in the Venn diagram of panel data labeled B' may denote the number of people in the larger universe being measured who accessed media content associated with the second media entity on a mobile device included in second group 1408 during a period of time. The region of the Venn diagram labeled '?', denotes the unknown overlap in the census data for accesses to the media content associated with the second media entity. The overlap '?' represents the estimated number of people who have accessed the media content associated with the second media entity on a personal computer included in the first group 1406 during a period of time and have also accessed the media content associated with the second media entity on a mobile device included in the second group 1408 during the period of time. As described above, the collection server 1404 may determine the values represented by 'A' and 'B' directly from the site centric data 132b (or other source of census data), but the 'X' value of '?' often cannot be determined or estimated through direct projections.

In order to estimate the overlap in the census data for media content associated with a media entity (i.e., the 'X' value of '?'), the collection server 1404 may be configured to apply one or more statistical models to the values of 'a', 'b', 'x', 'A', and 'B'. In some implementation, for example, the collection server 104 may be configured to apply a first statistical model 1420 that returns the 'X' value for '?' that gives the highest likelihood conditioned on the values of the corresponding 'a', 'b', 'x', 'A', and 'B'. In some implementations, the first statistical model 1420 applied by the collection server 1404 may be a method of obtaining Maximum Likelihood Estimate (MLE), which will be described in greater detail with regard to FIG. 15. The MLE method is one statistical model that returns the 'X' value for '?' that gives the highest likelihood conditioned on the values of the corresponding 'a', 'b', 'x', 'A', and 'B'. However, in other implementations, the collection server 1404 may be configured to apply a different statistical model or function than the MLE method. For example, any statistical function that estimates census overlap based on the same or similar information contained in or calculated from the panel data and the census data could be used in place of the MLE method.

The first statistical model 1420 applied by the collection server 1404 to the values of 'a', 'b', 'x', 'A', and 'B' may have the ability to estimate platform overlap in the census data for each of the media entities represented in the panel data. However, the first statistical model 1420 may not be able to estimate platform overlap in the census data for media entities not represented in the panel data. For example, if no one in the panel 1402 has visited a particular website, the panel data will not include values for 'a', 'b', and 'x' that the first statistical model 1420 would use to estimate the 'X' value of '?'. Therefore, the first statistical model 1420 may only be able to estimate the 'X' value of '?' for those media entities for which panel data has been gathered.

Moreover, in some implementations, the first statistical model 1420 may exhibit a reduced level of accuracy estimating the 'X' value of '?' for those media entities for which minimal or otherwise insufficient panel data has been collected. For example, one useful metric for determining the quality of panel data is reach. As described above, reach for a specific a media entity or a group of media entities is the fraction of the total audience or population that has accessed or viewed the media content over a period of time. For instance, in the case of webpage accesses, the reach may be the percentage of the panel members that have accessed a particular webpage over a period of time. The combined reach for two or more pieces of media content or media entities is the fraction of the audience that has accessed at least one of the pieces of media content or media content associated with one of the media entities. In some implementations, the first statistical model 1420 may exhibit a reduced level of accuracy estimating the 'X' value of '?' for those media entities with a low reach.

Therefore, the collection server 1404 may be configured to apply a second statistical model to the outputs of the first statistical model 1420 and develop a function for estimating the overlap in the census data for accesses to media entities across multiple platforms. In some implementations, for example, the collection server 1404 may be configured to perform a process 1422 by which the collection server 1404 applies the first statistical model 1420 to media entities or groups of media entities that exhibit a threshold level of features (e.g., a sufficient level of reach). The output of process 1422 is a set of training data 1424

In some implementations, the training data 1424 includes estimates of 'X' determined by the first statistical model 1420 for content related to a media entity accessed on two different platforms, where the panel data associated with the media entity exhibits a threshold level of features (e.g., reach). Additionally or alternatively, the training data 1424 may include estimates of 'X' determined by the first statistical model 1420 for groups of media entities that, together, are associated with panel data that exhibits a threshold level of features (e.g., reach). By grouping media entities, the collection server 1404 may create additional training data 1424 associated with features that satisfy the threshold levels. For example, where content associated with the group of media entities on the two platforms are websites, the reach of the panel data for each individual media entity's website may not be sufficient for any one of the media entities alone to satisfy the threshold level of reach necessary for the first statistical model 1420 to provide an accurate enough estimate of 'X' for use in the training data 1424. However, when the group of media entities is taken together, their collective reach within the panel access data may be sufficient to satisfy the threshold level of reach.

In some implementations, for each media entity and/or group of media entities included in the training data 1424, the training data 1424 may include the estimates of 'X' determined by the first statistical model 1420 and a set of features that describe characteristics about the panel data for the media entity or group. These features may include, for example, reach, frequency (e.g., number of pages accessed and/or minutes spent viewing media content), and/or dictionary differences between the content associated with the media entity across two platforms.

Based on the training data 1424, the collection server 1404 is configured to fit the training data 1424 to a second statistical model 1426 in order to derive an overlap function 1426 that estimates the overlap in census data for a media entity across multiple platforms. As described above, in some implementations, for each media entity and/or group of media entities included in the training data 1424, the training data 1424 may include the estimates of 'X' determined by the first statistical model 1420 and a set of features that describe characteristics about the panel data for the entity or group. In these implementations, the collection server 1404 is configured to fit the training data 1424 to a second statistical model 1426 to develop an overlap function 1426 that uses the features of any given media entity and/or group of related media entities, regardless of the quality of the features, as inputs to produce an estimate of 'X' for the census data related to the entity or group. In other words, the developed overlap function 1426 will be able to estimate 'X' for the census data related to any media entity and/or group of media entities included in the census data.

In the example shown in FIG. 14, there is a single collection server 1404. However, in other implementations there may be more than one collection server 1404. For example, each of the platforms in the first group of platforms 1406 and the second group of platforms 1408 may send data to more than one collection server for redundancy. In other implementations, the platforms in the first group of platforms 1406 and the second group of platforms 1408 may send data to different collection servers.

Again, though system 1400 has been illustrated with a panel 1402 including a first group of platforms 1406 and a second group of platforms 1408, the panel 1402 may include any number of groups of different types of platforms. In some implementations, the collection server 1404 may be configured to derive an overlap function 1428 for each pair combination of platform groups included in the panel 1402. For example, where the panel 1402 includes a group of mobile device users, a group of personal computer users, and a group of television users, the collection server 1404 may be configured to derive an overlap function 1428 for the group of mobile device users and the group of personal computer users, an overlap function 1428 for the group of mobile device users and the group of television users, and an overlap function 1428 for the group of personal computer users and the group of television users. Alternatively, in some implementations, the collection server 1404 may be configured to simultaneously derive an overlap function 1428 for all groups of different types of platforms included in the panel 1402.

FIG. 15 is a flow chart illustrating an example of a process 1500 for developing an overlap function that estimates the overlap in the census data for accesses by two platforms to the media content associated with a media entity. The following describes the process 1500 as being performed by the collection server 1404. However, the process 1500 may be performed by other systems or system configurations, including, for example, multiple collection servers 1404.

The collection server 1404 accesses panel data and census data representing accesses by two types of platforms to media content associated with multiple media entities (1502). As described above, the collection server 1404 may directly determine, from the site centric data 132b, the overlap in the panel data for accesses by two platforms to the media content associated with a media entity. In other words, with reference to the panel data Venn diagram shown in FIG. 14, the collection server 1404 accesses or directly determines values of a', b', and 'x' for multiple media entities across two types of platforms.

The collection server 104 also accesses census data representing accesses by two types of platforms to media content associated with multiple media entities. As described above, collection server 1404 may not be able to directly derive the platform overlap 'X' from the census data for each media entity across the two platforms. Specifically, the overlap, 'X', between 'A' and 'B' cannot be estimated with straight projection unless the sampling ratio $a/A$ is equal to the sampling ratio $b/B$. In that special case, the overlap can be computed by $$`X` = \frac{a}{A}x = \frac{b}{B}x.$$

Thus, with reference to the census data Venn diagram shown in FIG. 14, the collection server 1404 accesses values of 'A' and 'B', but not '?', unless the special case above is satisfied.

The collection server 1404 applies a first statistical model to the accessed panel data and census data to determine, for a subset of the multiple media entities, the overlap in the census data between the two types of platforms (1504). For example, with reference again to both Venn diagrams illustrated in FIG. 14, the collection server 1404 applies a first statistical model to the values a', 'b', and 'x' from the panel data and the derived values of 'A' and 'B' from the census data to determine the overlap 'X' for the census data. However, the collection server 1404 may apply the first statistical model to any data included in or derived from the panel data and census data in order to estimate the overlap between two or more platforms in the census data.

In some implementations, the first statistical model 1420 applied by the collection server 1404 may be a Maximum Likelihood Estimate (MLE) Method. For example, through application by the collection server 1404, the MLE method may return the 'X' value for '?' that gives the highest likelihood conditioned on the corresponding values of 'a', b', 'x', 'A', and 'B'. The probability to sample a', 'b' with 'x' overlap from 'A' and 'B' conditioned on 'X' overlap can be estimated by:

$$P(a, b, x, A, B | X) = \frac{\binom{A-X}{a-x}\binom{B-X}{b-x}\binom{X}{x}}{\binom{A+B-X}{a+b-x}} \qquad (1)$$

The MLE method may find the maximum likelihood point by solving for the 'X' that satisfies the following equation:

$$P(a,b,x,A,B|X) = P(a,b,x,A,B|X+1) \qquad (9)$$

The equation may only be satisfied at 'X' occurring before the peak of the symmetric likelihood curve (which corresponds to the maximum likelihood). To find the exact peak, the collection server 1404 adds a 0.5 constant to the solution. The closed form solution for 'X' at the maximum point is as follows:

$$X = \frac{-z_1 - \sqrt{z_1^2 - 4z_0 z_2}}{2z_2} + 0.5 \qquad (3)$$

where $$C_1 = x(A+B+1-(a+b-x))$$

$$C_2 = A(b-x)(A-a-x) + B(a-x)(B-b-x)$$

$$C_3 = A(b-x) + B(a-x) - (a-x)(b-x)$$

$$z_0 = A \cdot B \cdot C_1 - C_2$$

$$z_1 = C_3 - C_2 - (A+B)C_1$$

$$z_2 = C_1 + C_3$$

The output of the MLE method results in a value 'X' of '?' for one or more media entities across the pair of platforms in the observed panel 1402.

The collection server 1404 develops training data from the determined overlap values 'X' and features of the census data associated with each of the subset of the multiple media entities (1506). As described above, in some implementations, the collection server 1404 may develop training data based on a subset of media entities across the pair of platforms in the observed panel 1402 that exhibit a threshold level of features (e.g., a sufficient level of reach).

For all entities on platforms 'A' and 'B' in the census data, there are platform-specific features that can be measured without any knowledge of the overlap 'X' between the platforms. These features may include reach on 'A', reach on 'B', frequency on 'A', frequency on 'B', relative size of 'A' to 'B', and dictionary differences between the media content entities on 'A' and 'B'. For a subset of the media entities that exhibit a threshold level of features, the collection server 1404 can relatively accurately derive the overlap variable 'X' for platforms 'A' and 'B' through the MLE method. This subset forms the required training data.

In order for the collection server 1404 to train an unbiased model, the media content entities in the training set should be representative of all the media entities that may be estimated with the derived overlap function. However, as described above, the input features should exceed certain thresholds to ensure the accuracy of the estimated values of 'X' for the training data. By selecting the subset of media entities from the panel, the assumption is that the panel is representative of the census-level data. However, the input features for every individual media entity included in the panel data may not exceed the thresholds that ensure the accuracy of the estimated values of 'X' for these media entities.

In certain situations, this may mean that there are not enough individual media entities that exceed the features thresholds to develop a large enough set of training data. The collection server 1404 can mitigate the small size of the training data by selective sampling and/or by combining different media entities into larger groups of media entities, sometimes referred to as super entities. The super entities simulate a single media entity with higher reach than any of the individual media entities included in the super entity. The collection server 1404 may use the combined panel and census data associated with these super entities to apply the MLE method and develop additional training data.

With a sufficient set of training data, the collection server 1404 fits the developed training data to a second statistical model to derive estimates the overlap in the census data for accesses by two platforms to the media content associated with any media entity represented in the census data (1508). In some implementations, the second statistical model is a quantile regression model. For example, once the collection server 1404 builds the training data by applying the MLE method on entities and super entities, the collection server 1404 may fit the training data to a quantile regression model to develop an overlap function. The coefficients of the second statistical model form an overlap function that estimates the value of 'X' in the census data based on features observed in the census data for each media entity. Various examples of fitting the training data to the second statistical model are described below. However, the collection server 1404 may apply any method for fitting the training data to any second statistical model that will derive an overlap function.

For example, in one process of model fitting, the model is chosen to minimize an error cost function. This results with predictions that fall in the middle of the error range. In other words, the average residual error below the prediction is equal to that above the prediction. In this process of model fitting, a fit is desired that would slightly over-estimate the overlap, which would result in conservative estimates of the unique audience of the media content.

In one variation of the model, the collection server 1404 may derive an overlap function having the following form:

$$X = \alpha_1 R_A + \beta_1 I(R_A)_{\gamma 1} + \alpha_2 R_B + \beta_2 I(R_B)_{\gamma 2} + \alpha_3 F_A + \beta_3 I(F_A)_{\gamma 3} + \alpha_4 F_B + \beta_4 I(F_B)_{\gamma 4} + \alpha_5 P_B + \beta_5 I(P_B)_{\gamma 5} \quad (4)$$

where 'X' is the predicted overlap; $R_A$ and $R_B$ denote reach on platforms A and B respectively; $F_A$ and $F_B$ denote frequency on platforms A and B respectively (based on, e.g., duration or pages); and $P_B$ denotes the percentage of visitors on platform B over the total duplicated visitors on platforms A and B. Though Eq. (4) is described above with regard to reach (R) and frequency (F), other platform-specific features may be used. As previously described, the collection server 1404 can measure/calculate the above quantities at the census level without any knowledge of the overlap 'X'. The collection server 1404 can learn coefficients $\alpha_i$, $\beta_i$ and $\gamma_1$ (for i: 1→5) in Eq. (4) from the training data.

The indicator function $I(Y)_\gamma$ used in Eq. (4) may be defined as follows:

$$I(Y)_\gamma = \begin{cases} Y & : Y \leq \gamma \\ Y + \gamma & : Y \geq \gamma \end{cases} \quad (5)$$

The indicator function is parameterized by knots $\gamma_1$ that the collection server 1404 learns from the training data. The knots allow for a piecewise linear fit, and may increase accuracy in the model's prediction.

It is possible for the variation of the overlap function described above to yield results outside the valid range of a set intersection. By definition, the overlap 'X' is bounded by [0, min (A, B)]. However, in rare cases, the derived overlap function can generate results for 'X' that are not within these bounds. The collection server 1404 may handle these cases with conditional statements to set 'X'=0 when a prediction is negative, and 'X'=min (A, B) when a prediction is above the upper bound.

In another variation of the model, the collection server 1404 may derive an overlap function having the following form:

$$X = e^{\rho + \phi}$$

$$\rho = \alpha_1 \log(R_A) + \beta_1 \log(R_B) + \gamma_1 \log(R_A) \times \log(R_B)$$

$$\phi = \alpha_2 \log(F_A) + \beta_2 \log(F_B) + \gamma_2 \log(F_A) \times \log(F_B) \quad (6)$$

Where X is the predicted overlap; $R_A$ and $R_B$ denote reach on platforms A and B respectively; and $F_A$ and $F_B$ denote frequency on platforms A and B respectively (e.g., based on duration viewed or pages visited). As previously mentioned, the collection server 1404 can measure/calculate all the above quantities at the census level without any knowledge of the overlap 'X'. Moreover, the collection server 1404 can be determine the coefficients $\alpha_i$, $\beta_i$, and $\gamma_i$ (for i=1, 2) in Eq. 6 from the training set.

There are no knots in this form of the overlap function due to the log transformation providing a better fit for the training data. This decreases the number of parameters to be learned from 15 to 6. Another advantage of using the log transformation is the inherent natural bound; the general form of the function ($e^{\rho-\phi}$) is always strictly greater than zero. While this handles the lower bound, the upper bound can still be exceeded by the function's prediction, and a conditional correction is required.

A third variation of the function has the following form:

$$X = \frac{1}{1+e^{-\rho-\phi-c}} \times \min(A, B) \quad (7)$$
$$\rho = \alpha_1 R_A + \beta_1 R_B + \gamma_1 R_A \times R_B$$
$$\phi = \alpha_2 \log(F_A) + \beta_2 \log(F_B) + \gamma_2 \log(F_A) \times \log(F_B)$$

In this form, the model predicts 'X' as a fraction of the minimum of the sets A and B. The fraction is obtained by a logistic regression fit on the training data. Note that this fit includes an intercept c. With this form, 'X' is guaranteed to belong to the interval [0, min (A;B)] since the logistic output is bounded between 0 and 1. The inherent bounding of this functional form eliminates the need to handle outputs with conditional statements.

In some implementations, the collection server 1404 may validate the overlap function that results from the fitting of the second statistical model against sets of the training data that were not used in the model fitting process. Since the collection server 1404 may add super entities for better coverage of reach, these super entities may effectively simulate high reach entities. The collection server 1404 may hold one or more of these super entities out of the training data used in the model fitting process in order to create a validation set of media content entities. Once the collection server 1404 has derived the overlap function, it may use the validation set to validate and/or refine the accuracy of the derived overlap function.

Though operations 1504, 1506, and 1508 have been described as distinct operations, in other implementations, these operations may be combined into one combined statistical model or could be replaced by a neural network. Thus, though two statistical models are described in process 1500, more or less statistical models or functions could be used that produce similar results.

As described above, in some implementations, the collection server 1404 may be configured to derive an overlap function for each pair combinations of platforms represented in the panel and census data. There are different approaches to extend this methodology across more than two platforms. For example, one approach relies on pairwise overlaps and is described below.

Consider three platforms A, B, and C, where the goal is to estimate the total de-duplicated audience, A∪B∪C. In the pairwise case, the collection server 1404 can estimate A ∪ B by A+B−|A∩B|. In the three-set case, the collection server 1404 can estimate A∪B∪C by calculating the overlaps in sequential steps and merging these together. In the first step, we get A∪B, and in the second step we calculate A∪B∪C= (A∪B)∪C=|A∪B|+C−|(A∪B)∩C|.

The collection server 1404 can calculate A∪B∪C in multiple ways from the pairwise pieces, and the reporting requirements can typically dictate the pairwise platforms that are more useful to calculate than others. Moreover, the above-described approach is applicable to combining the overlap of more than three platforms. For example, where the panel/census data includes an additional platform D, the collection server 1404 can estimate A∪B∪C∪D by |A ∪B∪C|+D−| (A∪B∪C)∩D|. Without loss of generality, this approach can be applied to any number of platforms, by increasing the number of steps. For N platforms, N−1 steps are required.

Figure 16:
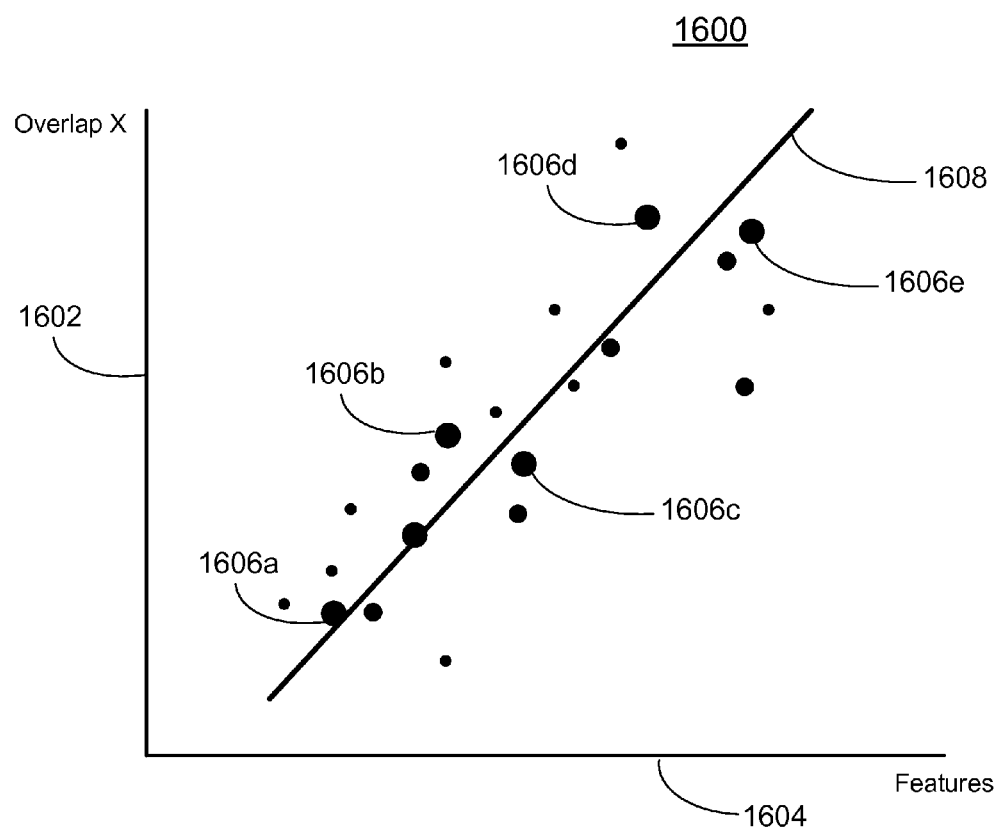
FIG. 16 is a graph of an example of a function for estimating access overlap to specific media content across two platforms.

FIG. 16 is a graph 1600 of an example of an overlap function that estimates the overlap in the census data for accesses by two platforms to the media content associated with a media entity. The overlap function illustrated in graph 1600 has been simplified for purposes of explanation. The overlap function produced by the methods described above with regard to FIG. 15 may be more complex.

Each of the circles included in the graph 1600 represent a media entity or group of media entities included the census data. The y-axis 1602 of the graph 1600 represents the actual overlap 'X' for each of the media entities. The x-axis 1604 represents one or more features of the census data associated with the media entity. As described with regard to FIG. 1500, for all media entities represented in the census data, there are features that can be measured without any knowledge of the overlap between the platforms. These features may include reach of 'A' and 'B', frequency of 'A' and 'B', relative size of 'A' to 'B', and dictionary differences between the media content entities on 'A' and 'B'. The circles included in the graph 1500 are illustrated with different sizes, where the size of a circle represents the reach of the media entity corresponding to the circle.

Circles 1506*a-e* represent media entities and/or super entities that have a reach that exceeds a threshold necessary to ensure that the first statistical model produces an accurate estimate of the overlap in the census data for accesses by two platforms to the media content associated with a media entity. Line 1508 represents the outputs of an overlap function derived by fitting a second statistical model to the features and estimated census overlap of each media content entity or super entity represented by circles 1506*a-e*. As visually represented by the position of the line 1508 with respect to circles 1506*a-e*, the collection server derives the overlap function in such a manner as to create the least mathematical distance between the circles 1506*a-e* and the line 1508.

Figure 17:
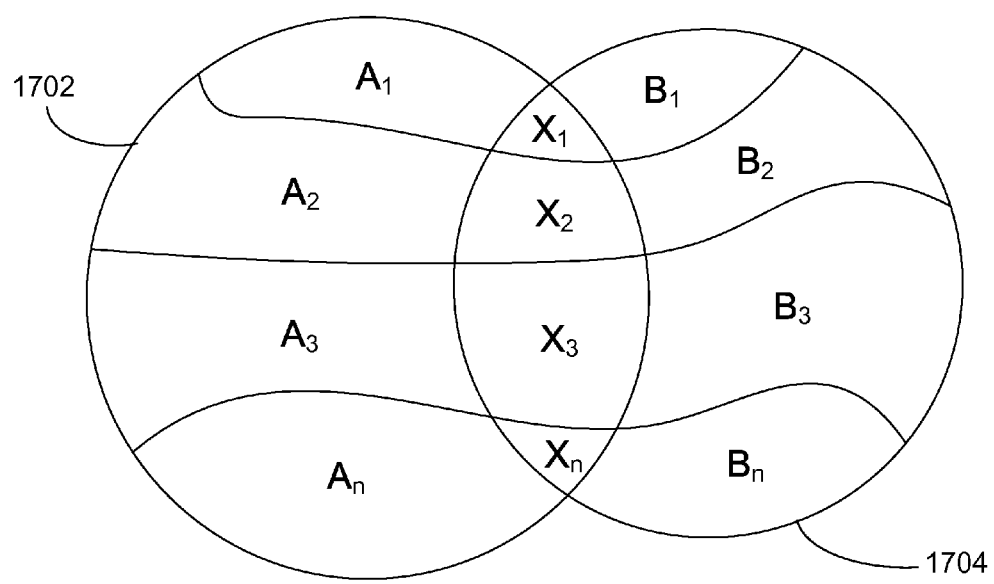
FIG. 17 is a diagram illustrating demographic segments within census access data across two platforms.

FIG. 17 is a diagram illustrating demographic segments within census data 1700 between two platforms 1702 and 1704. In FIG. 17, the census data for the platform represented by circle 1702 is made up of multiple demographic segments $A_1$ through $A_n$. Similarly, the census data for the platform represented by circle 1704 is made up of multiple demographic segments $B_1$ through $B_n$. The region of the resulting Venn diagram made up of segments $X_1$ through $X_n$, where the circle representing people accessing media content associated with a media entity on platform 1702 overlaps with the circle representing people accessing the media content associated with a media entity on platform 1704, indicates people who have accessed media content associated with the media entity on both platforms 1702 and 1704.

For any media entity accessed on a single platform, the demographic composition is defined as the distribution of distinct demographic segments (e.g. Females 18-24/Household size 2/Income under $60K). The number of segments within each platform can vary depending on what is reported as part of the panel data. On a single platform, the collection server 1704 may obtain the distribution of demographic segments within the census data by projecting weights applied on person-level observations (with known demography) from the panel data.

However, estimating the demographic composition of the overlap of the census data generally cannot be accomplished accurately by simply applying the same weights to a known demographic segment overlap in the panel data. Therefore, to report the census-level demographic composition of total unique accesses to media content associated with one or more media entities on both platforms, the collection server 1404 may estimate the overlap of demographic segments in the census data through application of one or more statistical models.

Figure 18:
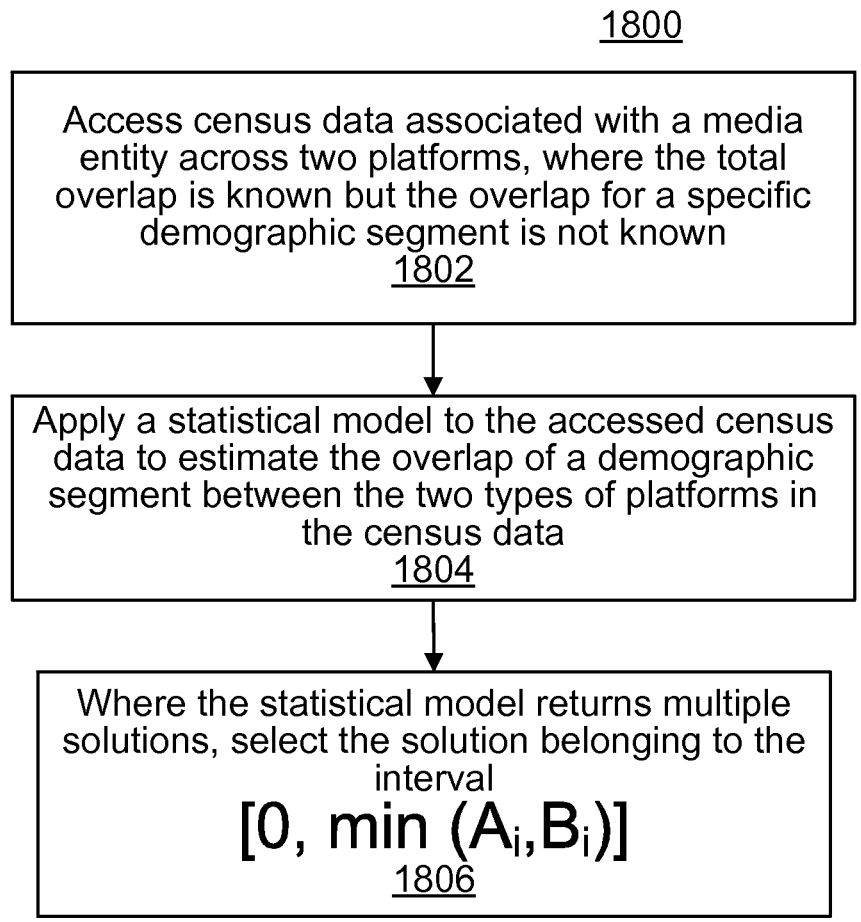
FIG. 18 is a flow chart illustrating an example of a process for estimating overlap of demographic segments within census access data related to specific media content across two platforms.

FIG. 18 is a flow chart illustrating an example of a process 1800 for estimating overlap of demographic segments in the census data for accesses by two platforms to the media content associated with a media entity. The following describes the process 1800 as being performed by the collection server 1404. However, the process 1800 may be performed by other systems or system configurations, including, for example, multiple collection servers 1404.

The collection server 1404 accesses various census data associated with a media entity across two platforms (1802). With reference to FIG. 17, in some implementations, for each media entity across both platforms 1702 and 1704, collection server 1404 may calculate the total census data associated with platform 1702 and the total census data associated with platform 1704 from the panel data associated with each platform. As described with regard to FIG. 17, the collection server 1404 may obtain the distribution of demographic segments within the census data for each platform 1702 and 1704 by projecting weights applied on person-level observations (with known demography) from the panel data associated with each of platforms 1702 and 1704. Moreover, the collection server 1404 may estimate the total overlap in the census data between platforms 1702 and 1704 by applying the process described above with regard to FIG. 15 or another process for estimating overlap. Thus, the collection server 1404 may access the total census data associated with platform 1702 ('A'), the total census data associated with platform 1704 ('B'), the total overlap in the census data between platforms 1702 and 1704 ('X'), demographic segments within the census data for each of platforms 1702 and 1704 ('$A_i$' and '$B_i$').

The collection server 1404 may apply a statistical model to the accessed census data to estimate the overlap in the census data between the two types of platforms for the demographic segment (1804). In some implementations, for example, the collection server 1404 may apply a demography MLE method similar to the MLE method described with regard to process 1500. The collection server 1404 may apply the demography MLE method to the total census data associated with platform 1702 ('A'), the total census access data associated with platform 1704 ('B'), the total overlap in the census data between platforms 1702 and 1704 ('X'), demographic segments within the census data for each of platforms 1702 and 1704 ('Ai' and 'Bi'). Based on these inputs the MLE method will return an estimate of the overlap of demographic segments in the census data across platforms 1702 and 1704 ($X_i$).

Using the Demography MLE method, the collection server 1404 solves for the maximum likelihood point, by finding the value of $X_i$ that satisfies the following equation:

$$P(A_i, B_i, A, B, X | X_i) = P(A_i, B_i, A, B, X | X_i + 1) \quad (8)$$

The equation is only satisfied at $X_i$ occurring before the peak of the symmetric likelihood curve (which corresponds to the maximum likelihood). To find the exact peak, the collection server 1504 adds a 0.5 constant to the solution. In some implementations, the closed form solution for $X_i$ at the maximum may be summarized as follows.

By expanding Eq. 8, the collection server 1404 arrives at the following formula:

$$\frac{\binom{A-X}{A_i-X_i}\binom{B-X}{B_i-X_i}\binom{X}{X_i}}{\binom{A+B-X}{A_i+B_i-X_i}} = \frac{\binom{A-X}{A_i-X_i-1}\binom{B-X}{B_i-X_i-1}\binom{X}{X_i+1}}{\binom{A+B-X}{A_i+B_i-X_i-1}} \quad (9)$$

Solving Eq. 9 for $X_i$, the collection server 1404 obtains a third order polynomial of the form:

$$X_i^3 + pX_i^2 + qX_i + r = 0 \quad (10)$$

where $p = (A_iB + 4A_i + Ab - AB - 2A + 4b - 2B + 3X - 3)/(-2)$ $q = (-A_i^2B - 2A_i^2 + A_iAB + 2A_iA - 2A_iB_iX - 4A_iB_i + 3A_iB - 4A_iX + 4A_i - AB_i^2 + AB_iB + 3AB_i - AB + AX - A - 2B_i^2 + 2B_iB - 4B_iX + 4B_i + BX - B - X^2 + 2X - 1)/(-2)$ $r = (A_i^2B_iX + A_i^2B_i - A_i^2B + A_i^2X - A_i^2 - A_iAB_iX - A_iAB_i + A_iAB - A_iAX + A_iA + A_iB_i^2X + A_iB_i^2 - A_iB_iBX - A_iB_iB + A_iB_iX^2 + A_iB_iX - 2A_iB_i - A_iBX + A_iB + A_iX^2 - 2A_iX + A_i - AB_i^2 + AB_iB - AB_iX + AB_i + B_i^2X - B_i^2 - B_iBX + B_iB - B_iX^2 - 2B_iX + B_i)/(-2) \quad (11)$ In this equation, p, q, and r are functions of known quantities: $A_i$, $B_i$, A, B, and X. The collection server 104 obtains a solution of the third order polynomial (Eq. 10) as follows:

Let $\alpha = (3q - p^2)/3$ $\beta = (2p^3 - 9pq + 27r)/27$ $$\delta = (\alpha^3/27) + (\beta^2/4) \quad (12)$$

In cases when $\delta > 0$, the real root is given by:

$$X_i = \sqrt[3]{-\frac{\beta}{2} + \sqrt{\delta}} + \sqrt[3]{-\frac{\beta}{2} - \sqrt{\delta}} - \frac{p}{3} \quad (13)$$

In cases when $\delta = 0$, the two real roots are given by:

$$|X_i' = \sqrt[3]{-\frac{\beta}{2} + \sqrt{\delta}} + \sqrt[3]{-\frac{\beta}{2} - \sqrt{\delta}} - \frac{p}{3} \quad (14)$$

$$X_i'' = -\left(\sqrt[3]{-\frac{\beta}{2} + \sqrt{\delta}} + \sqrt[3]{-\frac{\beta}{2} - \sqrt{\delta}}\right)/2 - \frac{p}{3}$$

In other cases when $\delta < 0$, the three real roots are given by:

$$X_i' = 2\sqrt{-\frac{\alpha}{3}} \cdot \cos\phi - \frac{p}{3} \quad (15)$$

$$X_i'' = 2\sqrt{-\frac{\alpha}{3}} \cos\phi + (2\pi/3) - \frac{p}{3}$$

-continued $$X_i''' = 2\sqrt{-\frac{\alpha}{3}} \cos\phi + (4\pi/3) - \frac{p}{3}$$

where $$\phi = \begin{cases} \cos^{-1}\left[\dfrac{\sqrt{\dfrac{(\beta^2)/4}{-\alpha^3/27}}}{3}\right] & : \beta \le 0 \\ \cos^{-1}\left[\dfrac{-\sqrt{\dfrac{(\beta^2)/4}{-\alpha^3/27}}}{3}\right] & : \beta > 0 \end{cases} \quad (16)$$

When there are multiple roots of Eq. 10, the collection server 1404 determines that only the non-negative root belonging to the interval [0, min ($A_i$, $B_i$)] is the solution that maximizes the likelihood of $X_j$ (1806). Upon determining the non-negative root, the collection server 1404 has an estimate of the overlap of demographic segments in the census data for accesses by two platforms to the media content associated with a media entity.

Systems for Implementation

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components.

The invention claimed is:

1. A computer-implemented method comprising:
    accessing a first set of data representing accesses by a first set of users with multiple types of media platforms to media content associated with multiple media entities, the first set of users being included in a sample of users included in a larger population of users;
    based on the accessed first set of data, determining, for each of multiple media entities, an overlap in the accessed first set of data that represents users in the first set of users who have accessed media content associated with the media entity with more than one of the multiple types of media platforms;
    accessing a second set of data representing accesses by a second set of users with at least one of the multiple types of media platforms to media content associated with the multiple media entities, wherein the second set of users includes a greater number of users than the first set of users;
    based on the accessed first set of data, the determined overlap in the accessed first set of data, and the accessed second set of data, deriving, by one or more processors, an overlap function that estimates an overlap in the accessed second data that represents users in the second set of users who have accessed media content associated with a media entity with more than one of the multiple types of media platforms; and
    applying, by the one or more processors, the derived overlap function to a third set of data associated with a first media entity to estimate an overlap in the third set of media data associated with the first media entity that represents users who have accessed media content associated with the first media entity with more than one of the multiple types of media platforms.

2. The computer-implemented method of claim 1, wherein deriving the overlap function comprises applying a Maximum Likelihood Estimate (MLE) method to the accessed first set of data, the determined overlap in the accessed first set of data, and the accessed second set of data.

3. The computer-implemented method of claim 1, wherein deriving the overlap function comprises training a quantile regression model to an estimated overlap in the second set of data and features derived from the accessed second set of data, the estimated overlap in the second set of data representing users in the second set of users who have accessed media content associated with a media entity with more than one of the multiple types of media platforms.

4. The computer-implemented method of claim 3, wherein the features derived from the accessed second set of data comprise platform reach, frequency on platform, relative size of platforms, and dictionary differences between related media entities on each platform.

5. The computer-implemented method of claim 1, wherein:
the accessed first set of data represents accesses by the first set of users with three types of media platforms; and
deriving the overlap function comprises generating an overlap function for each unique pair of the three types of media platforms, wherein each generated overlap function estimates overlap in the second set of data that represent users who have accessed media content associated with the first media entity with both media platforms in a unique pair of the three types of media platforms.

6. The computer-implemented method of claim 5, further comprising combining outputs from each of the generated overlap functions for each unique pair of the three types of media platforms to estimate a de-duplicated audience for a media entity across the three types of media platforms.

7. A system comprising:
a first set of media platforms configured to access media content associated with one or more media entities, the first set of media platforms being of multiple different types and being associated with a first set of users who access the media content with the media platforms;
a second set of media platforms configured to access media content associated with one or more media entities, the second set of media platforms being of multiple different types and being associated with a second set of users who access the media content with the media platforms;
one or processors;
one or more storage devices that store instructions that, when executed by the one or more processors, cause the one or more processors to perform operations comprising:
accessing a first set of data representing accesses by a first set of users with multiple types of media platforms to media content associated with multiple media entities, the first set of users being included in a sample of users included in a larger population of users;
based on the accessed first set of data, determining, for each of multiple media entities, an overlap in the accessed first set of data that represents users in the first set of users who have accessed media content associated with the media entity with more than one of the multiple types of media platforms;
accessing a second set of data representing accesses by a second set of users with at least one of the multiple types of media platforms to media content associated with the multiple media entities, wherein the second set of users includes a greater number of users than the first set of users;
based on the accessed first set of data, the determined overlap in the accessed first set of data, and the accessed second set of data, deriving an overlap function that estimates an overlap in the accessed second data that represents users in the second set of users who have accessed media content associated with a media entity with more than one of the multiple types of media platforms; and
applying the derived overlap function to a third set of data associated with a first media entity to estimate an overlap in the third set of media data associated with the first media entity that represents users who have accessed media content associated with the first media entity with more than one of the multiple types of media platforms.

8. The system of claim 7, wherein deriving the overlap function comprises applying a Maximum Likelihood Estimate (MLE) method to the accessed first set of data, the determined overlap in the accessed first set of data, and the accessed second set of data.

9. The system of claim 7, wherein deriving the overlap function comprises training a quantile regression model to an estimated overlap in the second set of data and features derived from the accessed second set of data, the estimated overlap in the second set of data representing users in the second set of users who have accessed media content associated with a media entity with more than one of the multiple types of media platforms.

10. The system of claim 9, wherein the features derived from the accessed second set of data comprise platform reach, frequency on platform, relative size of platforms, and dictionary differences between related media entities on each platform.

11. The system of claim 7, wherein:
the accessed first set of data represents accesses by the first set of users with three types of media platforms; and
deriving the overlap function comprises generating an overlap function for each unique pair of the three types of media platforms, wherein each generated overlap function estimates overlap in the second set of data that represent users who have accessed media content associated with the first media entity with both media platforms in a unique pair of the three types of media platforms.

12. The system of claim 11, wherein the one or more storage devices further store instructions that, when executed by the one or more processors, cause the one or more processors to perform the operation of: combining outputs from each of the generated overlap functions for each unique pair of the three types of media platforms to estimate a de-duplicated audience for a media entity across the three types of media platforms.

13. A non-transitory computer readable medium storing instructions that, when executed by one or more computing devices, cause the one or more computing devices to perform operations comprising:
accessing a first set of data representing accesses by a first set of users with multiple types of media platforms to media content associated with multiple media entities, the first set of users being included in a sample of users included in a larger population of users;
based on the accessed first set of data, determining, for each of multiple media entities, an overlap in the accessed first set of data that represents users in the first set of users who have accessed media content associated with the media entity with more than one of the multiple types of media platforms;
accessing a second set of data representing accesses by a second set of users with at least one of the multiple types of media platforms to media content associated with the multiple media entities, wherein the second set of users includes a greater number of users than the first set of users;
based on the accessed first set of data, the determined overlap in the accessed first set of data, and the accessed second set of data, deriving an overlap function that estimates an overlap in the accessed second data that represents users in the second set of users who have accessed media content associated with a media entity with more than one of the multiple types of media platforms; and
applying the derived overlap function to a third set of data associated with a first media entity to estimate an overlap in the third set of media data associated with the first media entity that represents users who have accessed media content associated with the first media entity with more than one of the multiple types of media platforms.

14. The non-transitory computer readable medium of claim 13, wherein deriving the overlap function comprises applying a Maximum Likelihood Estimate (MLE) method to the accessed first set of data, the determined overlap in the accessed first set of data, and the accessed second set of data.

15. The non-transitory computer readable medium of claim 13, wherein deriving the overlap function comprises training a quantile regression model to an estimated overlap in the second set of data and features derived from the accessed second set of data, the estimated overlap in the second set of data representing users in the second set of users who have accessed media content associated with a media entity with more than one of the multiple types of media platforms.

16. The non-transitory computer readable medium of claim 15, wherein the features derived from the accessed second set of data comprise platform reach, frequency on platform, relative size of platforms, and dictionary differences between related media entities on each platform.

17. The non-transitory computer readable medium of claim 13, wherein:
the accessed first set of data represents accesses by the first set of users with three types of media platforms; and
deriving the overlap function comprises generating an overlap function for each unique pair of the three types of media platforms, wherein each generated overlap function estimates overlap in the second set of data that represent users who have accessed media content associated with the first media entity with both media platforms in a unique pair of the three types of media platforms.

18. The non-transitory computer readable medium of claim 17, wherein the stored instructions further comprise instructions that, when executed by the one or more computing devices, cause the one or more computing devices to perform the operation of: combining outputs from each of the generated overlap functions for each unique pair of the three types of media platforms to estimate a de-duplicated audience for a media entity across the three types of media platforms.

19. A computer-implemented method comprising:
accessing a first set of data representing accesses by a first set of users, the first set of users being included in a sample of users from a larger population of users, each user in the first set of users having accessed one or more items of media content within a first set of media content associated with one or more of multiple media entities, and each user in the first set of users having accessed the first set of media content on one or more of multiple types of media platforms;
based on the accessed first set of data, determining, for a first of the multiple media entities, an amount of users in the first set of users who have accessed one or more items of media content within the first set of media content associated with the first media entity on more than one of the multiple types of media platforms;
accessing a second set of data representing accesses by a second set of users to a second set of media content associated with the multiple media entities, wherein the second set of users includes a greater number of users than the first set of users, each user in the second set of users having accessed media content within the second set of media content associated with one or more of the multiple media entities, and each user in the second set of users having accessed the second set of media content on one or more of the multiple types of media platforms;
based on (1) the accessed first set of data, (2) the determined amount of users in the first set of users who have accessed one or more items of media content within the first set of media content associated with the first media entity on more than one of the multiple types of media platforms, and (3) the accessed second set of data, deriving, by one or more processors, a function that estimates an amount of users in the second set of users who have accessed media content associated with any one of the multiple media entities on more than one of the multiple types of media platforms; and
applying, by the one or more processors, the derived function to a third set of data associated with one or more second media entities to estimate an amount of users who have accessed media content associated with the one or more second media entities on more than one of the multiple types of media platforms.

* * * * *